United States Patent
Akaho et al.

(10) Patent No.: US 9,283,936 B2
(45) Date of Patent: Mar. 15, 2016

(54) BRAKING FORCE CONTROL APPARATUS FOR VEHICLE

(75) Inventors: Daisuke Akaho, Susono (JP); Masatoshi Nakatsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 14/241,937

(22) PCT Filed: Aug. 29, 2011

(86) PCT No.: PCT/JP2011/069450
§ 371 (c)(1),
(2), (4) Date: Feb. 28, 2014

(87) PCT Pub. No.: WO2013/030923
PCT Pub. Date: Mar. 7, 2013

(65) Prior Publication Data
US 2014/0207355 A1    Jul. 24, 2014

(51) Int. Cl.
| | |
|---|---|
| B60T 8/17 | (2006.01) |
| B60T 8/1755 | (2006.01) |
| B60T 1/10 | (2006.01) |
| B60T 13/58 | (2006.01) |
| B60L 3/10 | (2006.01) |
| B60L 7/18 | (2006.01) |
| B60L 7/26 | (2006.01) |
| B60L 15/20 | (2006.01) |

(Continued)

(52) U.S. Cl.
CPC ............... *B60T 8/1755* (2013.01); *B60K 28/16* (2013.01); *B60L 3/108* (2013.01); *B60L 7/18* (2013.01); *B60L 7/26* (2013.01); *B60L 15/2009* (2013.01); *B60T 1/10* (2013.01); *B60T 8/17* (2013.01); *B60T 8/176* (2013.01); *B60T 8/17616* (2013.01); *B60T 11/04* (2013.01); *B60T 13/586* (2013.01); *B60W 10/08* (2013.01); *B60W 10/184* (2013.01); *B60W 30/02* (2013.01); *B60W 30/18127* (2013.01); *B60L 2220/44* (2013.01); *B60L 2260/26* (2013.01); *B60T 2270/604* (2013.01); *B60W 2520/26* (2013.01); *Y02T 10/648* (2013.01); *Y02T 10/7275* (2013.01)

(58) Field of Classification Search
None
See application file for complete search history.

(56) References Cited

U.S. PATENT DOCUMENTS

| | | | |
|---|---|---|---|
| 5,433,512 A | * | 7/1995 | Aoki et al. .................... 303/3 |
| 6,122,588 A | * | 9/2000 | Shehan et al. ............... 701/93 |

(Continued)

FOREIGN PATENT DOCUMENTS

| | | |
|---|---|---|
| CN | 1521046 A | 8/2004 |
| DE | 102010003076 A1 | 8/2011 |

(Continued)

*Primary Examiner* — Rami Khatib
(74) *Attorney, Agent, or Firm* — Oliff PLC

(57) ABSTRACT

An electronic control unit of a braking force control apparatus for a vehicle activates, as a first state, in-wheel motors in a regeneration state, thereby generating motor braking torques, and causes friction brake mechanisms to generate friction braking forces. Moreover, the unit activates, as a second state, the motors in a power running state, thereby generating motor driving torques, and causes the mechanisms to generate friction braking forces. Then, when the state is caused to transition between the first state and the second state, the unit changes magnitudes of the braking torques or the driving torques generated by the motors to one of increase and decrease, and changes magnitudes of the friction braking forces generated by the mechanisms to one of increase and decrease.

13 Claims, 18 Drawing Sheets

(51) Int. Cl.
*B60K 28/16* (2006.01)
*B60W 10/08* (2006.01)
*B60W 10/184* (2012.01)
*B60W 30/02* (2012.01)
*B60W 30/18* (2012.01)
*B60T 8/1761* (2006.01)
*B60T 8/176* (2006.01)
*B60T 11/04* (2006.01)

(56) References Cited

U.S. PATENT DOCUMENTS

| | | | |
|---|---|---|---|
| 6,346,064 B1* | 2/2002 | Hada et al. | 477/171 |
| 7,565,954 B2* | 7/2009 | Kawahara et al. | 188/1.11 L |
| 2004/0122579 A1 | 6/2004 | Ashizawa et al. | |
| 2007/0018499 A1* | 1/2007 | Kokubo et al. | 303/151 |
| 2012/0130581 A1 | 5/2012 | Semsey et al. | |
| 2013/0060409 A1* | 3/2013 | Matsushita et al. | 701/22 |
| 2013/0173127 A1 | 7/2013 | Nakatsu et al. | |

FOREIGN PATENT DOCUMENTS

| | | |
|---|---|---|
| JP | A-08-098313 | 4/1996 |
| JP | A-10-297462 | 11/1998 |
| JP | A-11-321625 | 11/1999 |
| JP | A-2001-97204 | 4/2001 |
| JP | A-2005-210798 | 8/2005 |
| JP | A-2009-273275 | 11/2009 |
| JP | B2-5104998 | 12/2012 |

* cited by examiner

BRAKING FORCE CONTROL APPARATUS FOR VEHICLE

TECHNICAL FIELD

The present invention relates to a braking force control apparatus for a vehicle, which is configured to control braking forces of a vehicle, and more particularly, to a braking force control apparatus for a vehicle, which is configured to appropriately avoid a lock state of wheels during braking.

Conventionally, for example, a braking control apparatus for an electric vehicle disclosed in Patent Literature 1 has been known. The related-art braking control apparatus for an electric vehicle maintains, while ABS control is being carried out, a hydraulic braking force command value to the same value as a previous hydraulic braking force command value, that is, maintains a mechanical braking force constant, and simultaneously controls a torque of a motor for driving in a range from a regeneration mode to a power running mode.

Moreover, conventionally, for example, a braking force control apparatus disclosed in Patent Literature 2 has also been known. During anti-lock brake control, in a case where regeneration cooperation depressurizing is carried out when first depressurizing is carried out after start of control of working fluid pressure to wheel cylinders, the related-art braking force control apparatus adds a depressurizing correction period corresponding to a depressurizing amount by the regeneration cooperation depressurizing to a depressurizing period calculated by the anti-lock brake control, and carries out the depressurizing depending on the corrected depressurizing period.

Moreover, conventionally, for example, a braking force control apparatus disclosed in Patent Literature 3 has also been known. While ABS control is being carried out, the related-art braking force control apparatus decreases both a hydraulic braking force and a regeneration braking force in a state where a slip ratio exceeds a threshold, and gradually increases the hydraulic braking force and maintains the regeneration braking force constant in a state where the slip ratio falls below the threshold. Then, in the related-art braking force control apparatus, when the regeneration braking force decreases to zero, subsequently, the regeneration braking force is prevented from decreasing, thereby preventing the regeneration braking force from becoming negative, that is, preventing a driving force from being generated during a brake operation.

Moreover, conventionally, for example, a braking force control apparatus for an automobile disclosed in Patent Literature 4 has also been known. The related-art braking force control apparatus for an automobile provides feedback control so that a slip ratio of a wheel coincides with a target slip ratio, calculates a motor torque command value, thereby controlling a braking/driving torque of a motor, and sets a motor torque target value for securing a torque control range of the motor both in negative and positive sides. Then, the related-art braking force control apparatus for an automobile determines ABS activation, then provides the feedback control so that a torque detected value of the motor coincides with the motor torque target value, and calculates a friction brake torque command value, thereby controlling a friction brake torque of a mechanical brake.

Moreover, conventionally, for example, a driving force control apparatus for a vehicle and a driving force control method for a vehicle disclosed in Patent Literature 5 have also been known. The related-art driving force control apparatus for a vehicle and the related-art driving force control method for a vehicle compare a magnitude of a torque of each of motors and a prescribed preload torque with each other when a collision avoidance operation is being prepared, or an end of the collision avoidance operation is being prepared. Then, when the magnitude of the torque of the motor has not reached the preload torque, a torque of the motor for driving front wheels and a torque of the motor for driving rear wheels are determined so that the torques of both of the motors reach the preload torque, and the motor for driving the rear wheels is caused to carry out power running by an amount of regeneration by the motor for driving the front wheels.

Moreover, conventionally, for example, a control apparatus for a vehicle disclosed in Patent Literature 6 has also been known. The related-art control apparatus for a vehicle controls a friction brake mechanism when a driving force or a braking force generated on any one of front wheels and rear wheels based on a driving force distribution ratio calculated so as to restrain pitching or bouncing of a body is close to zero, thereby generating a predetermined braking force on any one of the front and rear wheels, and generating a driving force for canceling the predetermined braking force on the one of the front and rear wheels.

Further, conventionally, for example, a braking apparatus for an electric vehicle disclosed in Patent Literature 7 has also been known. The related-art braking apparatus for an electric vehicle reduces regeneration by regeneration braking when the braking apparatus enters from a regeneration braking mode into an ABS mode, thereby switching an operation by means of the regeneration braking to an operation by means of a hydraulic braking.

CITATION LIST

Patent Literature

[PTL 1] JP 05-270387 A
[PTL 2] JP 11-321625 A
[PTL 3] JP 10-297462 A
[PTL 4] JP 2001-97204 A
[PTL 5] JP 2005-210798 A
[PTL 6] JP 2009-273275 A
[PTL 7] JP 08-98313 A

SUMMARY OF INVENTION

By the way, in the related-art braking control apparatus for an electric vehicle disclosed in Patent Literature 1, the braking force control apparatus disclosed in Patent Literature 2, and the braking force control apparatus for an automobile disclosed in Patent Literature 4, the torque is decreased/increased (that is, the torque is secured on both the negative and positive sides) during the ABS control. In this case, a backlash is usually set in a power transmission system (such as a speed reduction machine) provided between the motor and the wheels. Therefore, for example, when the torque to be generated is inverted by the regeneration control and the power running control for the motor for driving, a time lag in terms of control may occur, and an appropriate control property may not be provided. Moreover, when the motor for driving is activated by means of the regeneration control and the power running control, the set backlash is reduced, resulting in tendency of noise generation, which makes a driver feel sense of discomfort.

The present invention is devised in order to solve the above-mentioned problem, and has an object to provide a braking force control apparatus for a vehicle, which avoids a lock state of the wheels without the sense of discomfort during braking, and appropriately brakes the vehicle.

In order to achieve the above-mentioned object, the present invention is applied to a braking force control apparatus for a vehicle, including: an electromotive force generation mechanism for generating, independently on a wheel of a vehicle, an electromagnetic driving force or an electromagnetic braking force; a braking force generation mechanism for generating a mechanical braking force on the wheel rotated by at least the electromagnetic driving force generated by the electromotive force generation mechanism; and braking control means for controlling activations of the electromotive force generation mechanism and the braking force generation mechanism so as to generate a braking force on the wheel, and for activating, when the wheel tends to be locked, the electromotive force generation mechanism in any one of a power running state and a regeneration state so as to generate the electromagnetic driving force or the electromagnetic braking force, and, simultaneously, controlling the braking force generation mechanism to generate the mechanical braking force.

The braking force control apparatus for a vehicle according to the present invention has a feature in that: the braking control means controls generation of the braking force on the wheel in: a first state where the electromotive force generation mechanism is activated in the regeneration state so as to generate the electromagnetic braking force having a predetermined magnitude, and, simultaneously, the braking force generation mechanism is controlled to generate the mechanical braking force having a predetermined magnitude, thereby activating the electromotive force generation mechanism and the braking force generation mechanism in cooperation with each other; and a second state where the electromotive force generation mechanism is activated in the power running state so as to generate the electromagnetic driving force having a predetermined magnitude, and, simultaneously, the braking force generation mechanism is controlled to generate the mechanical braking force having a predetermined magnitude, thereby activating the electromotive force generation mechanism and the braking force generation mechanism in cooperation with each other; and when a state is caused to transition from one of the first state and the second state to another of the first state and the second state, a magnitude of the electromagnetic braking force or a magnitude of the electromagnetic driving force generated by the electromotive force generation mechanism is changed to one of increase and decrease, and a magnitude of the mechanical braking force generated by the braking force generation mechanism is changed to one of increase and decrease.

Note that, in this case, the braking control means may include: state transition determination means for controlling the generation of the braking force on the wheel in the first state where the electromotive force generation mechanism is activated in the regeneration state so as to generate the electromagnetic braking force having a predetermined magnitude, and, simultaneously, the braking force generation mechanism is controlled to generate the mechanical braking force having a predetermined magnitude, thereby activating the electromotive force generation mechanism and the braking force generation mechanism in cooperation with each other, and the second state where the electromotive force generation mechanism is activated in the power running state so as to generate the electromagnetic driving force having a predetermined magnitude, and, simultaneously, the braking force generation mechanism is caused to generate the mechanical braking force having a predetermined magnitude, thereby activating the electromotive force generation mechanism and the braking force generation mechanism in cooperation with each other, and for determining whether or not to cause the state to transition from the one of the first state and the second state to the another of the first state and the second state; and generation mechanism activation means for changing, when the state is caused to transition based on the determination of the state transition determination means, the magnitude of the electromagnetic braking force or the magnitude of the electromagnetic driving force generated by the electromotive force generation mechanism to one of increase and decrease, and changing the mechanical braking force generated by the braking force generation mechanism to one of increase and decrease.

In this configuration, when the state is caused to transition between the first state and the second state, more specifically, when it is necessary to cause the state to transition between the first state and the second state, the braking control means can change the magnitude of the electromagnetic driving force or the electromagnetic braking force generated by the electromotive force generation mechanism to increase or decrease, and can change the magnitude of the mechanical braking force generated by the braking force generation mechanism to increase or decrease. In other words, the braking control means can maintain, in one direction, the change directions of the magnitudes of the forces (or an acting direction of the forces) respectively generated by the electromotive force generation mechanism and the braking force generation mechanism when the state is caused to transition.

As a result, when the state is caused to transition between the first state and the second state in order to appropriately brake the vehicle having wheels which tend to lock, the electromotive force generation mechanism is not repeatedly activated in the power running state and the regeneration state, that is, an inverting state where the electromagnetic driving force and the electromagnetic braking force are repeatedly generated does not occur, and the mechanical braking force by the braking force generation mechanism cooperating with the electromotive force generation mechanism does not fluctuate. Thus, the driver does not feel a sense of discomfort caused by the fluctuation in the braking force generated on the wheels for braking the vehicle. Moreover, the acting direction of the electromagnetic driving force or the electromagnetic braking force generated by the electromotive force generation mechanism can be maintained in one direction, and thus, for example, even when a backlash is provided on a power transmission system (such as a speed reduction machine) to the wheels of the electromotive force generation mechanism, the time lag in terms of control generated by reducing the backlash is not generated, and the noise caused by the backlash can be prevented from being generated. Thus, extremely excellent responsiveness is secured, thereby quickly converging the state transition, and generating appropriate braking forces on the wheels.

Moreover, in this case, the braking control means can: determine a required braking force required for the wheel for braking the vehicle; and change, in a case where the state is caused to transition, when a magnitude of the determined required braking force increases or decreases, any one of the magnitude of the electromagnetic driving force generated by the electromotive force generation mechanism, the magnitude of the electromagnetic braking force generated by the electromotive force generation mechanism, and the magnitude of the mechanical braking force generated by the braking force generation mechanism to one of increase and decrease.

Note that, in this case, the braking control means can include required braking force determination means for determining the required braking force required for the wheel for braking the vehicle. Then, in a case where the braking control means includes the state transition determination means, the generation mechanism activation means, and the required braking force determination means, and the state transition determination means determines to cause the state to transition, when the magnitude of the determined required braking force determined by the required braking force determination means increases or decreases, the generation mechanism activation means can change any one of the magnitude of the electromagnetic driving force generated by the electromotive force generation mechanism, the magnitude of the electromagnetic braking force generated by the electromotive force generation mechanism, and the magnitude of the mechanical braking force generated by the braking force generation mechanism to one of increase and decrease.

Moreover, in this case, specifically, the braking control means can, for example: in a case where the state is caused to transition from the first state to the second state, when the magnitude of the required braking force increases, increase the magnitude of the mechanical braking force generated by the braking force generation mechanism while maintaining the magnitude of the electromagnetic braking force generated by the electromotive force generation mechanism, and when the magnitude of the required braking force decreases, decrease the magnitude of the electromagnetic braking force generated by the electromotive force generation mechanism while maintaining the magnitude of the mechanical braking force generated by the braking force generation mechanism; and in a case where the state is caused to transition from the second state to the first state, when the magnitude of the required braking force increases, decrease the magnitude of the electromagnetic driving force generated by the electromotive force generation mechanism while maintaining the magnitude of the mechanical braking force generated by the braking force generation mechanism, and when the magnitude of the required braking force decreases, decrease the magnitude of the mechanical braking force generated by the braking force generation mechanism while maintaining the magnitude of the electromagnetic braking force generated by the electromotive force generation mechanism.

Note that, in this case, when the braking control means includes the state transition determination means, the generation mechanism activation means, and the required braking force determination means, in a case where the state transition determination means determines to cause the state to transition from the first state to the second state, when the magnitude of the required braking force determined by the required braking force determination means increases, the generation mechanism activation means can increase the magnitude of the mechanical braking force generated by the braking force generation mechanism while maintaining the magnitude of the electromagnetic braking force generated by the electromotive force generation mechanism, and when the magnitude of the required braking force determined by the required braking force determination means decreases, the generation mechanism activation means can decrease the magnitude of the electromagnetic braking force generated by the electromotive force generation mechanism while maintaining the magnitude of the mechanical braking force generated by the braking force generation mechanism. Further, in a case where the state transition determination means determines to cause the state to transition from the second state to the first state, when the magnitude of the required braking force determined by the required braking force determination means increases, the generation mechanism activation means can decrease the magnitude of the electromagnetic driving force generated by the electromotive force generation mechanism while maintaining the magnitude of the mechanical braking force generated by the braking force generation mechanism, and when the magnitude of the required braking force determined by the required braking force determination means decreases, the generation mechanism activation means can decrease the magnitude of the mechanical braking force generated by the braking force generation mechanism while maintaining the magnitude of the electromagnetic braking force generated by the electromotive force generation mechanism.

In these configurations, any one of the magnitude of the electromagnetic driving force, the magnitude of the electromagnetic braking force, and the magnitude of the mechanical braking force is increased or decreased depending on the increase or decrease in the required braking force. As a result, the change of the required braking force can be responded by increasing or decreasing any one of the forces, and the driver does not feel the sense of discomfort caused by the fluctuation in the braking force generated on the wheels for braking the vehicle.

Moreover, in those cases, the braking control means can, for example: compare a change amount in the magnitude of the determined required braking force and a predetermined change amount set in advance with each other; change, when the change amount is more than the predetermined change amount set in advance, the magnitude of the mechanical braking force generated by the braking force generation mechanism to one of increase and decrease depending on a magnitude of the change amount; and change, when the change amount is equal to or less than the predetermined change amount set in advance, the magnitude of the electromagnetic braking force generated by the electromotive force generation mechanism to one of increase and decrease depending on the magnitude of the change amount.

Note that, in this case, the braking control means can include determination means for comparing and determining the change amount in the determined magnitude of the required braking force and the predetermined change amount set in advance. Then, when the braking control means includes the required braking force determination means, the determination means, and the generation mechanism activation means, and when the determination means determines that the change amount of the required braking force determined by the required braking force determination means is more than the predetermined change amount set in advance, the generation mechanism activation means may change the magnitude of the mechanical braking force generated by the braking force generation mechanism to one of increase and decrease depending on the magnitude of the change amount, and when the determination means determines that the change amount of the required braking force determined by the required braking force determination means is equal to or less than the predetermined change amount set in advance, the generation mechanism activation means may change the magnitude of the electromagnetic braking force generated by the electromotive force generation mechanism to one of increase and decrease depending on the magnitude of the change amount.

As a result, when the required braking force increases or decreases during the state transition, the change in required braking force can be responded by increasing or decreasing, depending on the magnitude of the change amount of the increase or the decrease, any one of the magnitude of the electromagnetic driving force by the electromotive force generation mechanism, the magnitude of the electromagnetic braking force by the electromotive force generation mechanism, and the magnitude of the mechanical braking force by the braking force generation mechanism. As a result, robustness in the braking control can be increased, and the state transition can surely be converged in a short period.

Moreover, the braking force control apparatus for a vehicle according to the present invention described above has another feature in that: the braking control means can use, when the state is caused to transition, any one of the electromagnetic driving force generated by the electromotive force generation mechanism, the electromagnetic braking force generated by the electromotive force generation mechanism, and the mechanical braking force generated by the braking force generation mechanism to avoid a tendency of lock of the wheel.

Note that, in this case, when the braking control means includes the state transition determination means and the generation mechanism activation means, in a case where the state transition determination means determines to cause the state to transition, the generation mechanism activation means can use any one of the electromagnetic driving force generated by the electromotive force generation mechanism, the electromagnetic braking force generated by the electromotive force generation mechanism, and the mechanical braking force generated by the braking force generation mechanism to avoid the tendency of the lock of the wheel.

As a result, the tendency of the lock of the wheel can be avoided, thereby appropriately braking the vehicle. Then, also in this case, when the state is caused to transition, the inverting state where the electromagnetic driving force and the electromagnetic braking force are repeatedly generated does not occur, and the mechanical braking force by the braking force generation mechanism activated in cooperation with the electromotive force generation mechanism does not fluctuate. Thus, the driver does not feel the sense of discomfort caused by the fluctuation in the braking force generated on the wheels to surely avoid the tendency of the lock of the wheel, and to appropriately brake the vehicle. Moreover, also in this case, the acting direction of the electromagnetic driving force or the electromagnetic braking force generated by the electromotive force generation mechanism can be maintained in one direction, and thus, for example, the time lag in terms of control generated by reducing the backlash in the power transmission system to the wheel of the electromotive force generation mechanism is not generated, and the noise caused by the backlash can be prevented from being generated. Thus, extremely excellent responsiveness is secured, thereby quickly converging the state transition, and generating appropriate braking forces on the wheels.

In this case, the braking control means can, in the case where the state is caused to transition, use, when a magnitude of a friction coefficient of a road surface on which the vehicle travels is smaller than a magnitude of a predetermined friction coefficient, the electromagnetic driving force or the electromagnetic braking force generated by the electromotive force generation mechanism so as to avoid the tendency of the lock of the wheel; and use, when the magnitude of the friction coefficient of the road surface on which the vehicle travels is equal to or more than the magnitude of the predetermined friction coefficient, the mechanical braking force generated by the braking force generation mechanism so as to avoid the tendency of the lock of the wheel.

Note that, in this case, when the braking control means includes the state transition determination means and the generation mechanism activation means, in a case where the state transition determination means determines to cause the state to transition, the generation mechanism activation means can use, when the magnitude of the friction coefficient of the road surface on which the vehicle travels is smaller than the magnitude of the predetermined friction coefficient, the electromagnetic driving force or the electromagnetic braking force generated by the electromotive force generation mechanism so as to avoid the tendency of the lock of the wheel, use, when the magnitude of the friction coefficient of the road surface on which the vehicle travels is equal to or more than the magnitude of the predetermined friction coefficient, the mechanical braking force generated by the braking force generation mechanism so as to avoid the tendency of the lock of the wheel.

Moreover, in those cases, the braking control means can: use, when the state is caused to transition from the first state to the second state, the electromagnetic driving force or the electromagnetic braking force generated by the electromotive force generation mechanism so as to avoid the tendency of the lock of the wheel; and use, when the state is caused to transition from the second state to the first state, the mechanical braking force generated by the braking force generation mechanism so as to avoid the tendency of the lock of the wheel.

Note that, in this case, when the braking control means includes the state transition determination means and the generation mechanism activation means, the generation mechanism activation means can use, when the state transition determination means determines to cause the state to transition from the first state to the second state, the electromagnetic driving force or the electromagnetic braking force generated by the electromotive force generation mechanism so as to avoid the tendency of the lock of the wheel, and use, when the state transition determination means determines to cause the state to transition from the second state to the first state, the mechanical braking force generated by the braking force generation mechanism so as to avoid the tendency of the lock of the wheel.

In these configurations, for example, even when the required braking force required for the wheel cannot be appropriately determined in order to brake the vehicle as described above, the tendency of the lock of the wheel can be surely avoided while the state is caused to transition depending on the road surface condition. Then, also in this case, when the state is caused to transition, the inverting state where the electromagnetic driving force and the electromagnetic braking force are repeatedly generated does not occur, and the mechanical braking force by the braking force generation mechanism activated in cooperation with the electromotive force generation mechanism does not fluctuate. Thus, when the tendency of the lock of the wheel is surely avoided to appropriately brake the vehicle, the driver does not feel the sense of discomfort.

Moreover, in those cases, the braking control means can cause, for example, when the electromotive force generation mechanism transitions from a state where one of the electromagnetic driving force and the electromagnetic braking force is generated to a state where another of the electromagnetic driving force and the electromagnetic braking force is generated, the state to transition from the one of the first state and the second state to the another of the first state and the second state.

Note that, in this case, when the braking control means includes the state transition determination means and the generation mechanism activation means, the state transition determination means can cause, when the generation mechanism activation means causes the electromotive force generation mechanism to transition from the state where one of the electromagnetic driving force and the electromagnetic braking force is generated to the state where another of the electromagnetic driving force and the electromagnetic braking force is generated, the state to transition from the one of the first state and the second state to the another of the first state and the second state.

As a result, the state can surely be caused to transition between the first state and the second state. Thus, the electromotive force generation mechanism and the braking force generation mechanism can be appropriately activated in cooperation with each other depending on the state as a result of the transition, resulting in generation of appropriate braking forces on the wheels.

Moreover, the braking force control apparatus for a vehicle according to the present invention described above has another feature in that, the braking control means causes, when a driver carries out an operation of changing a travel state of the vehicle, the state to transition from the one of the first state and the second state to the another of the first state and the second state.

In this case, the operation carried out by the driver to change the travel state of the vehicle is preferred to be, for example, at least one of a brake operation for braking the vehicle, an accelerator operation for accelerating the vehicle, or a steering operation for turning the vehicle.

Further, in this case, the braking control means can: control, when the driver carries out the brake operation, the electromotive force generation mechanism to generate the electromagnetic braking force or control the braking force generation mechanism to generate the mechanical braking force earlier in time; control, when the driver carries out the accelerator operation, the electromotive force generation mechanism to generate the electromagnetic driving force earlier in time; and control, when the driver carries out the steering operation, the electromotive force generation mechanism to generate the electromagnetic braking force or control the braking force generation mechanism to generate the mechanical braking force on a wheel on an inside of turn of the vehicle earlier in time, and control the electromotive force generation mechanism to generate the electromagnetic driving force on a wheel on an outside of the turn of the vehicle earlier in time.

Note that, in those cases, the braking control means can include operation determination means for determining whether or not the driver carries out the operation to change the travel state of the vehicle. When the braking control means includes the state transition determination means, and when the operation determination means determines that the driver carries out the operation to change the travel state of the vehicle, the state transition determination means can cause the state to transition from the one of the first state and the second state to the another of the first state and the second state. Moreover, when the braking control means includes the operation determination means and the generation mechanism activation means, and when the operation determination means determines that the driver carries out the brake operation, the generation mechanism activation means can control the electromotive force generation mechanism to generate the electromagnetic braking force or control the braking force generation mechanism to generate the mechanical braking force earlier in time. When the operation determination means determines that the driver carries out the accelerator operation, the generation mechanism activation means can control the electromotive force generation mechanism to generate the electromagnetic driving force earlier in time. When the operation determination means determines that the driver carries out the steering operation, the generation mechanism activation means can control the electromotive force generation mechanism to generate the electromagnetic braking force or can control the braking force generation mechanism to generate the mechanical braking force on the wheel on the inside of the turn of the vehicle earlier in time, and can control the electromotive force generation mechanism to generate the electromagnetic driving force on the wheel on the outside of the turn of the vehicle earlier in time.

In these configurations, simultaneously with an operation such as the brake operation, the accelerator operation, and the steering operation of changing the travel state (or the motion state) of the vehicle by the driver, the electromotive force generation mechanism and the braking force generation mechanism can be activated in cooperation with each other, thereby causing the state to transition. In other words, in this case, the state can be caused to transition while the state transition is made inconspicuous in the state change of the vehicle intended by the operation of the driver. Therefore, for example, when the acceleration changes as a result of the state transition, the state is caused to transition simultaneously with the brake operation by the driver, thereby making the acceleration change generated as a result of the state transition inconspicuous in the acceleration change caused by the brake operation intended by the driver. Thus, the driver rarely feels a sense of discomfort caused by the fluctuation in the braking force even when the state is changed to surely avoid the tendency of the lock of the wheel, and to appropriately brake the vehicle.

Further, in those cases, the braking control means can determine to cause, based on a state of a road surface on which the vehicle travels, the state to transition from the one of the first state and the second state to the another of the first state and the second state. Further, in this case, specifically, the braking control means can, for example: estimate a slip ratio generated on the wheel, thereby estimating, based on the estimated slip ratio, a magnitude of a friction coefficient of the road surface on which the vehicle travels; determine, when the magnitude of the estimated friction coefficient of the road surface is less than a magnitude of a predetermined friction coefficient, to cause the state to transition from the first state to the second state; and determine, when the magnitude of the estimated friction coefficient on the road surface is equal to or more than the magnitude of the predetermined friction coefficient, to cause the state to transition from the second state to the first state.

Note that, in this case, the braking control means can include road surface state detection means for detecting the road surface state on which the vehicle travels. Then, when the braking control means includes the state transition determination means and the road surface state detection means, the state transition determination means can determine to cause the state to transition from the one of the first state and the second state to the another of the first state and the second state based on the state of the road surface on which the vehicle travels, which is detected by the road surface state detection means. Further, in this case, the road surface state detection means may include slip ratio estimation means for estimating the slip ratio generated on the wheel, and road surface friction coefficient estimation means for estimating a friction coefficient of the road surface on which the vehicle travels based on the slip ratio estimated by the slip ratio estimation means.

In these configurations, the state of the road surface on which the vehicle travels can be more precisely recognized. Thus, whether or not the state is caused to transition between the first state and the second state can be more precisely determined, the electromotive force generation mechanism and the braking force generation mechanism can be appropriately activated in cooperation with each other depending on the state as a result of the transition, and the appropriate braking force can be generated on the wheel.

DESCRIPTION OF EMBODIMENTS

Figure 1:
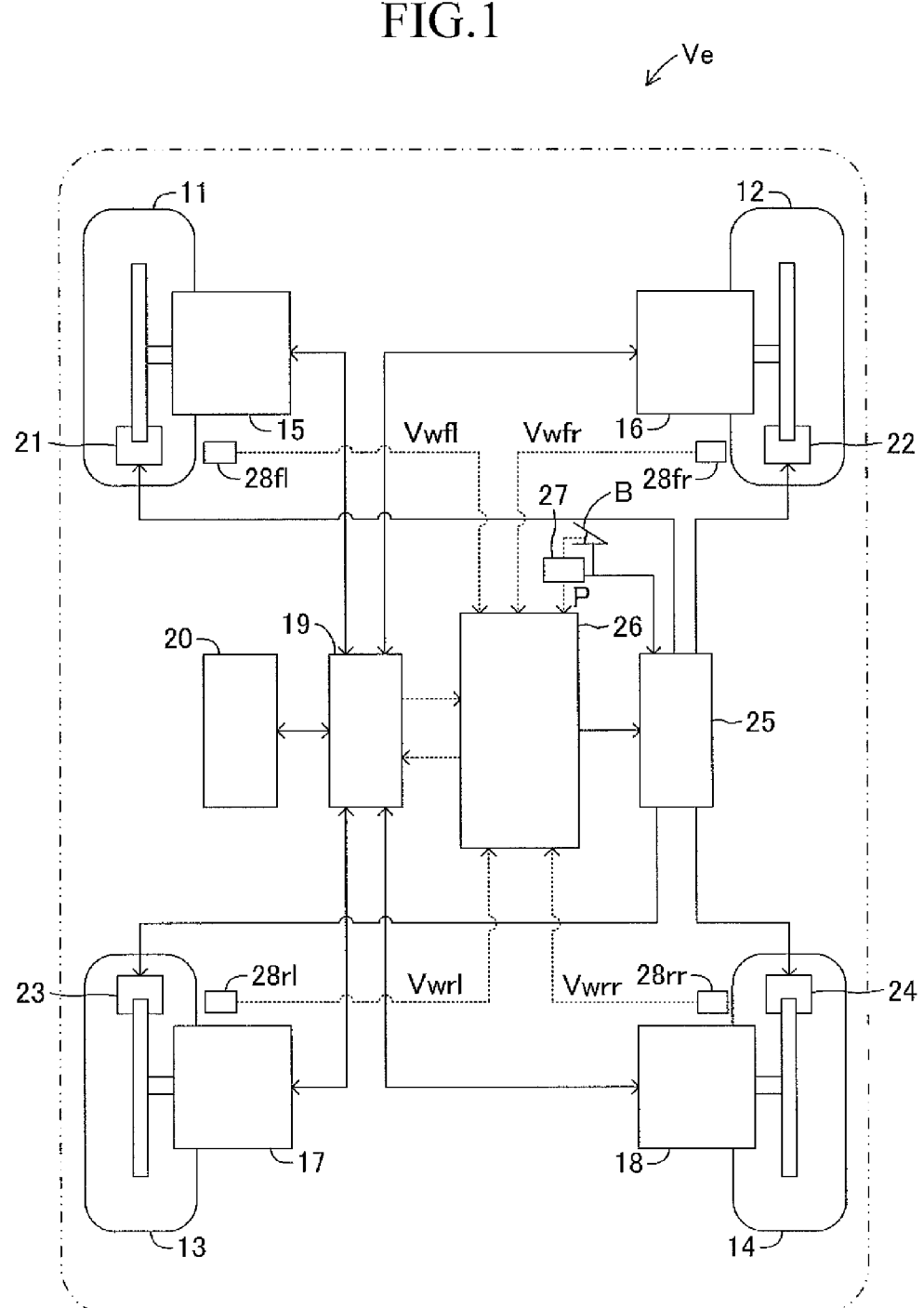
FIG. 1 is a schematic diagram schematically illustrating a configuration of a vehicle to which a braking force control apparatus for a vehicle according to the present invention can be applied.

A detailed description is now given of embodiments of the present invention referring to the drawings. FIG. 1 schematically illustrates a configuration of a vehicle Ve carrying a braking force control apparatus for a vehicle according to the present invention.

The vehicle Ve includes left and right front wheels 11 and 12 and left and right rear wheels 13 and 14. Then, motors 15 and 16 are respectively built into insides of the left and right front wheels 11 and 12, motors 17 and 18 are respectively built into insides of the left and right rear wheels 13 and 14, and the motors 15 to 18 are respectively coupled to the left and right front wheels 11 and 12 and the left and right rear wheels 13 and 14 via a power transmission system (such as a speed reduction machine having a predetermined gear mechanism) (not shown) so as to enable power transmission. In other words, the motors 15 to 18 are so-called in-wheel motors 15 to 18, and are respectively disposed together with the left and right front wheels 11 and 12 and the left and right rear wheels 13 and 14 at unsprung locations of the vehicle Ve. Then, driving forces and braking forces to be generated on the left and right front wheels 11 and 12 and the left and right rear wheels 13 and 14 can be independently controlled by independently controlling rotations of the respective in-wheel motors 15 to 18.

Each of the in-wheel motors 15 to 18 is constructed by, for example, an AC synchronous motor. Then, a DC electric power of an electricity storage apparatus 20 such as a battery and a capacitor is converted via an inverter 19 to an AC electric power, and the AC electric power is fed to each of the in-wheel motors 15 to 18. As a result, the respective in-wheel motors 15 to 18 undergo drive control (that is, power running control), and impart motor driving torques as electromagnetic driving forces to the left and right front wheels 11 and 12 and the left and right rear wheels 13 and 14.

Moreover, regeneration control can be applied to the respective in-wheel motors 15 to 18 by using rotation energy of the left and right front wheels 11 and 12 and the left and right rear wheels 13 and 14. As a result, when the respective in-wheel motors 15 to 18 are used for the regeneration/electric power generation, the rotation (kinetic) energy of the left and right front wheels 11 and 12 and the left and right rear wheels 13 and 14 is converted by the respective in-wheel motors 15 to 18 into electric energy, and electric power (so-called regeneration electric power) as a result of the conversion is accumulated via the inverter 19 in the electricity storage apparatus 20. On this occasion, the respective in-wheel motors 15 to 18 impart motor braking torques as electromagnetic braking forces based on the regeneration and electric power generation to the corresponding left and right front wheels 11 and 12 and left and right rear wheels 13 and 14.

Moreover, friction brake mechanisms 21, 22, 23, and 24 are respectively installed between the wheels 11 to 14 and the in-wheel motors 15 to 18 corresponding thereto. Each of the friction brake mechanisms 21 to 24 is a publicly known brake apparatus such as a disc brake or a drum brake, and imparts a friction braking force as a mechanical braking force by means of friction to each of the left and right front wheels 11 and 12 and the left and right rear wheels 13 and 14. Then, the friction brake mechanisms 21 to 24 include a brake actuator 25 for activating pistons of brake calipers, brake shoes (both thereof are not shown), or the like for generating a braking force on each of the wheels 11 to 14 by means of a hydraulic pressure (brake fluid pressure) pressure-fed from a master cylinder (not shown) as a result of a depressing operation on a brake pedal B.

The inverter 19 and the brake actuator 25 are respectively connected to an electronic control unit 26 for controlling a rotation state (more specifically, a regeneration state or a power running state) of each of the in-wheel motors 15 to 18, and an operation state (more specifically, a braking state or a brake releasing state) of each of the friction brake mechanisms 21 to 24. Thus, the respective in-wheel motors 15 to 18, the inverter 19, and the electricity storage apparatus 20 constitute an electromotive force generation mechanism according to the present invention, the friction brake mechanisms 21 to 24 and the brake actuator 25 constitute a braking force generation mechanism according to the preset invention, and the electronic control unit 26 constitutes braking control means according to the present invention.

The electronic control unit 26 includes, as a major component, a microcomputer including a CPU, a ROM, a RAM, and the like, and executes various programs including programs described later. Therefore, the electronic control unit 26 receives inputs of respective signals from various sensors including a brake sensor 27 for detecting a depressing force P by the driver on the brake pedal B, and wheel speed sensors 28$i$ (i=fl, fr, rl, and rr) for respectively detecting wheel speeds Vwi (i=fl, fr, it and rr) of the respective wheels 11 to 14 and a signal from the inverter 19.

In this way, the respective sensors 27 and 28$i$ (i=fl, fr, rl, and rr) and the inverter 19 are connected to the electronic control unit 26, and the respective signals are input to the electronic control unit 26. The electronic control unit 26 can thus recognize a travel state of the vehicle Ve, and can control activations of the in-wheel motors 15 to 18 and the friction brake mechanisms 21 to 24. Specifically, the electronic control unit 26 can calculate a braking force required to brake the vehicle Ve depending on a brake operation amount by the driver based on the signals input from the brake sensor 27 and the wheel speed sensors 28$i$ (i=fl, fr, rl, and rr). Moreover, the electronic control unit 26 can calculate output torques (motor torques) of the respective in-wheel motors 15 to 18 based on the signals (such as signals representing electric energy and current values supplied or regenerated during the power running control or the regeneration control of the respective in-wheel motors 15 to 18) input from the inverter 19.

As a result, the electronic control unit 26 can output signals for respectively controlling, via the inverter 19, the rotations of the respective in-wheel motors 15 to 18 (more specifically, the power running state or the regeneration state) and signals for respectively controlling, via the brake actuator 25, the activations (more specifically, the braking state or the brake releasing state) of the respective friction brake mechanisms 21 to 24. Thus, the electronic control unit 26 can control the travel state of the vehicle Ve, more specifically, the braking state of the vehicle Ve.

Figure 2:
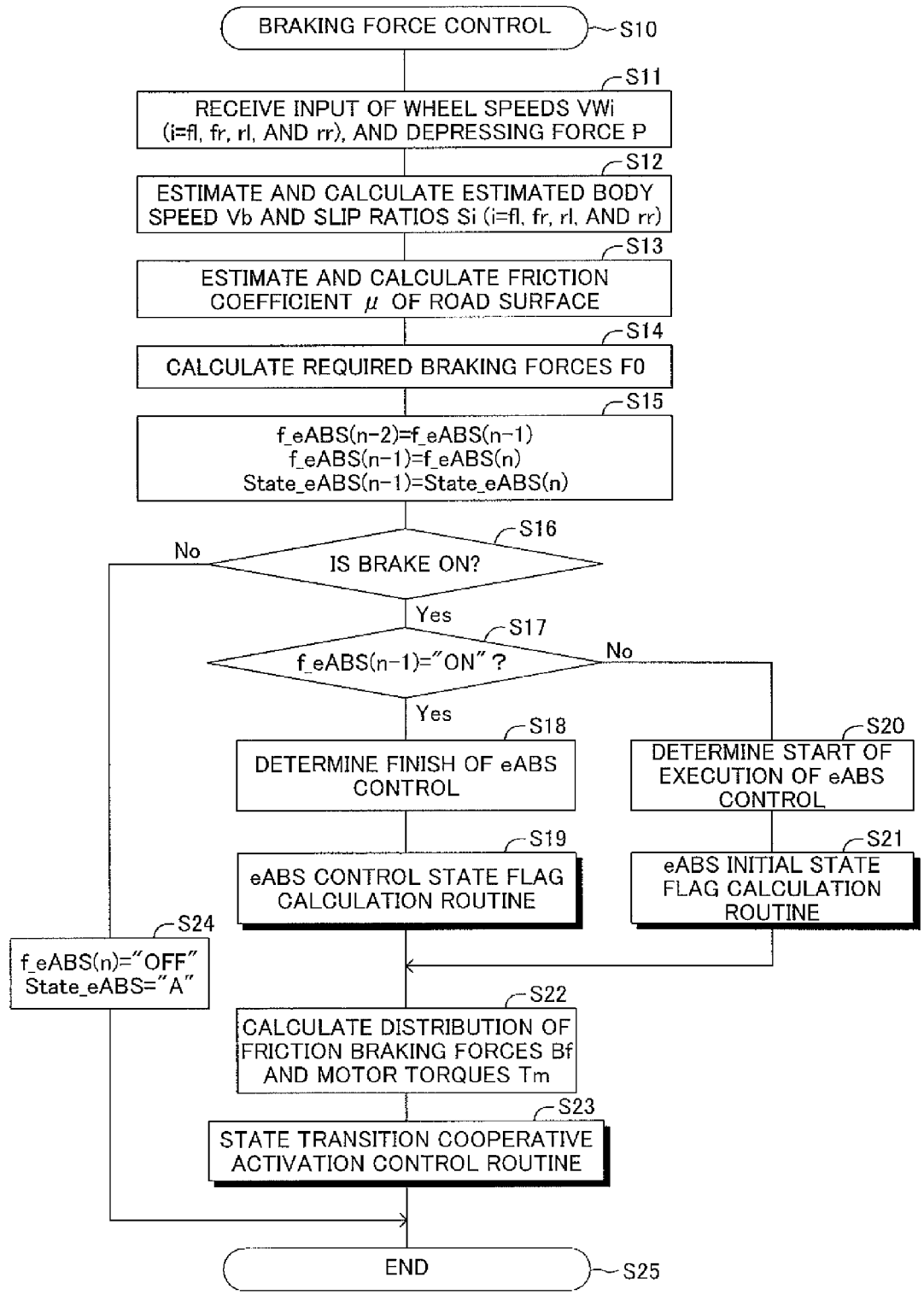
FIG. 2 is a flowchart of a braking control program executed by an electronic control unit in FIG. 1.

A detailed description is now given of the activation states, that is, braking force control, of the respective in-wheel motors 15 to 18 and the respective friction brake mechanisms 21 to 24 by the electronic control unit 26. When the electronic control unit 26 (more specifically, the CPU) provides the traveling vehicle Ve with the braking control, the electronic control unit 26 repeats execution of a braking control program illustrated in FIG. 2 at a predetermined short time interval. Specifically, the electronic control unit 26 starts the execution of the braking control program in Step S10, and, in Step S11, which follows, receives the input of the signal representing the depressing force P and the signals representing the wheel speed Vwi (i=fl, fr, rl, and rr) of the respective wheels 11 to 14 respectively from the brake sensor 27 and the wheel speed sensors 28$i$ (i=fl, fr, rl, and rr). Then, after the electronic control unit 26 receives the input of the respective signals, the electronic control unit 26 proceeds to Step S12.

In Step S12, the electronic control unit 26 estimates an estimated body speed Vb based on the respective wheel speeds Vwi (i=fl, fr, ri, and rr) input from the wheel speed sensors 28$i$ (i=fl, fr, rl, and rr) in Step S11, and calculates slip ratios Si (i=fl, fr, rl, and rr) as respective deviations between the estimated body speed Vb and the respective wheel speeds Vwi (i=fl, fr, rl, and rr) for the respective wheels 11 to 14. On this occasion, well-known calculation methods which have conventionally been widely employed can be employed for the calculation of the estimated body speed Vb and the slip ratios Si (i=fl, fr, rl, and rr), and a brief description is given thereof.

Regarding the estimated body speed Vb, the electronic control unit 26 first selects a value considered to be closest to an actual body speed as an estimated body speed Vwb out of the wheel speeds Vwi (i=fl, fr, rl, and rr) of the respective wheels 11 to 14. Then, the electronic control unit 26 calculates an estimated body speed Vbn1 acquired by subtracting a positive constant v1 from an estimated body speed Vbf calculated last time in order to restrain an increase rate of the estimated body speed, and an estimated body speed Vbn2 acquired by adding a positive constant v2 to the estimated body speed Vbf in order to restrain a decrease rate of the estimated body speed. Then, the electronic control unit 26 estimates (determines) a medium value of the selected estimated body speed Vwb, the calculated estimated body speed Vbn1, and the calculated estimated body speed Vbn2 as the estimated body speed Vb for this time.

Regarding the slip ratios Si (i=fl, fr, rl, and rr), the electronic control unit 26 respectively subtracts the wheel speeds Vwi (i=fl, fr, rl, and rr) of the respective wheels 11 to 14 from the estimated (determined) body speed Vb. Then, the electronic control unit 26 estimates and calculates the slip ratios Si (i=fl, fr, rl, and rr) of the respective wheels 11 to 14 by dividing the values calculated by the subtraction by the estimated body speed Vb. After the electronic control unit 26 estimates (determines) the estimated body speed Vb, and estimates and calculates the slip ratios Si (i=fl, fr, rl, and rr) of the respective wheels 11 to 14 in this way, the electronic control unit 26 proceeds to Step S13. Note that, the slip ratios Si (i=fl, fr, rl, and rr) of the respective wheels 11 to 14 are hereinafter also simply referred to as slip ratio S of the wheel for easy understanding.

Figure 3:
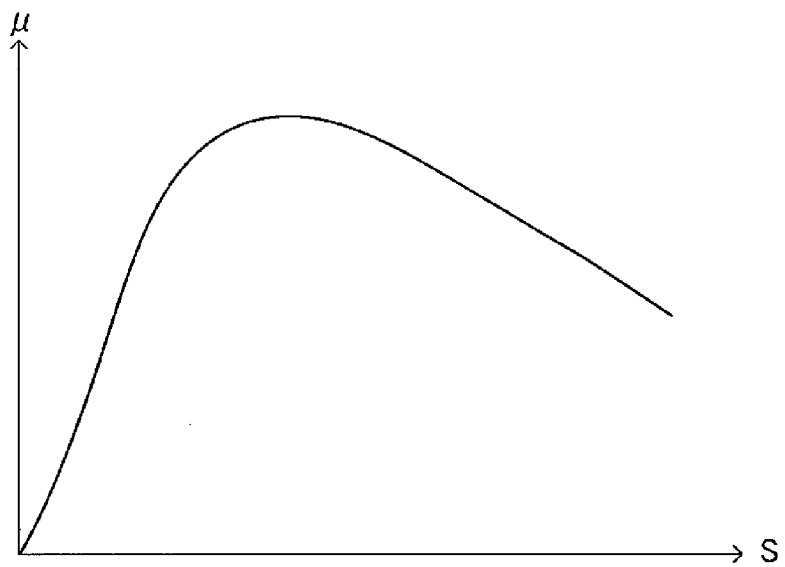
FIG. 3 is a chart illustrating a relationship between a slip ratio and a friction coefficient of a road surface.

In Step S13, the electronic control unit 26 estimates and calculates a friction coefficient μ of a road surface corresponding to the calculated slip ratio S of the wheel in Step S12 based on an S-μ identification determined as illustrated in FIG. 3 as a relationship between the friction coefficient of the road surface and the slip ratio S of the wheel. Note that, the S-μ characteristic has such a change identification that the friction coefficient μ of the road surface increases as the slip ratio S of the wheel increases, and the friction coefficient μ of the road surface gradually decreases as the slip ratio S of the wheel increases after the slip ratio S of the wheel exceeds a certain value as illustrated in FIG. 3. In this way, after the electronic control unit 26 estimates and calculates the friction coefficient μ of the road surface by using the slip ratio S of the wheel, the electronic control unit 26 proceeds to Step S14.

Figure 4:
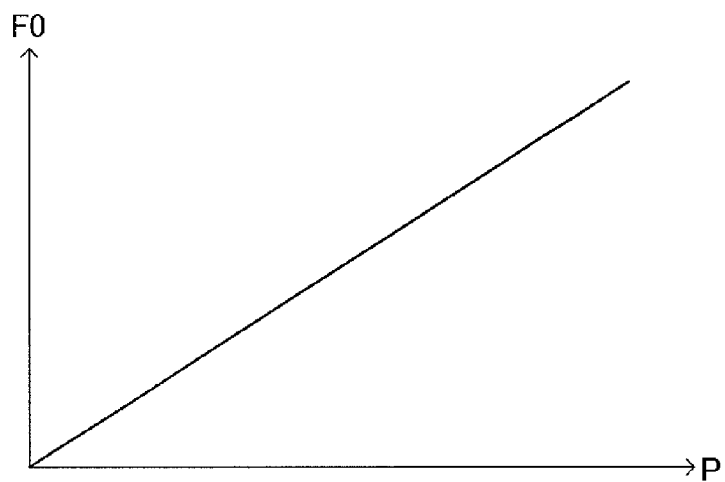
FIG. 4 is a chart illustrating a relationship between a depressing force on a brake pedal and a required braking force.

In Step S14, the electronic control unit 26 calculates braking forces T0 (the braking force T0 is hereinafter referred to as "required braking force F0 ") required and deemed as necessary for braking the vehicle Ve in response to the depressing force P on the brake pedal B input from the brake sensor 27 in Step S11. Specifically, as illustrated in FIG. 4, the electronic control unit 26 calculates the required braking forces F0 which change, for example, as a proportional function with respect to the change in the depressing force P. Then, after the electronic control unit 26 calculates the required braking forces F0, the electronic control unit 26 proceeds to Step S15.

In Step S15, the electronic control unit 26 sets a flag f_eABS (this flag is hereinafter referred to as "eABS start flag f_eABS") representing a start state of antiskid control (the antiskid control is hereinafter referred to as "eABS" control) for causing the respective in-wheel motors 15 to 18 and the respective friction brake mechanisms 21 to 24 to cooperate with each other, and controlling the braking forces on the respective wheels 11 to 14 when each of the wheels 11 to 14 has an excessive slip caused by the braking force (has a tendency of lock), thereby avoiding a locked state. Moreover, the electronic control unit 26 sets a flag State_aABS (this flag is hereinafter referred to as "eABS control state flag State_e-ABS") representing a state of the eABS control. Note that, a detailed description is later given of the eABS start flag f_eABS and the eABS control state flag State_eABS.

In other words, the electronic control unit 26 sets an eABS start flag f_eABS(n−2) corresponding to a time when the program is executed second last time to an eABS start flag f_eABS(n−1), and sets an eABS start flag f_eABS(n−1) corresponding to a time when the program is executed last time to an eABS start flag f_eABS(n). Moreover, the electronic control unit 26 sets an eABS control state flag State_eABS (n−1) corresponding to a time when the program is executed last time to an eABS control state flag State_eABS(n). Then, after the electronic control unit 26 sets the eABS start flags f_eABS and the eABS control state flag State_eABS, the electronic control unit 26 proceeds to Step S16.

In Step S16, the electronic control unit 26 determines whether or not a braking command is issued by the driver, that is, the brake is ON or not based on the value of the depressing force P input from the brake sensor 27 in Step S11. In other words, for example, when the depressing force P is larger than "0", the driver has issued the braking command, that is, the brake is ON. Therefore, the electronic control unit 26 makes a determination of "Yes", and proceeds to Step S17. On the other hand, when the depressing force P is "0", the driver has not issued the braking command, that is, the brake is OFF. Therefore, the electronic control unit 26 makes a determination of "No", and proceeds to Step S24.

In Step S24, the driver has not issued the braking command, and hence the electronic control unit 26 sets the value of the eABS start flag f_eABS(n) to "OFF", which represents a state where the eABS control is not carried out. Moreover, the electronic control unit 26 sets the value of the eABS control state flag State_eABS to "A" representing a state A described later. Then, after the electronic control unit 26 sets the eABS start flags f_eABS (n) and the eABS control state flag State_eABS in this way, the electronic control unit 26 proceeds to Step S25.

In Step S25, the electronic control unit 26 once finishes the execution of the braking control program. Then, after an elapse of a predetermined short period, in Step S10, the electronic control unit 26 starts again the execution of the braking control program.

In Step S17, the electronic control unit 26 determines whether or not the value of the eABS start flag f_eABS(n−1) is set to "ON", which represents that the execution of the eABS control has started. In other words, when the eABS start flag f_eABS(n−1) is set to "ON", the eABS control is being carried out. Therefore, the electronic control unit 26 makes a determination of "Yes", and proceeds to Step S18. On the other hand, when the eABS start flag f_eABS(n−1) is not set to "ON", that is, the value of the eABS start flag f_eABS(n−1) is "OFF", the eABS control is not being carried out. Therefore, the electronic control unit 26 makes a determination of "No", and proceeds to Step S20.

In Step S18, the eABS control is presently being carried out, and the electronic control unit 26 thus makes a finish determination for the eABS control. Specifically, for example, when the estimated body speed Vb estimated in Step S12 is equal to or lower than a predetermined body speed Vbs set in advance for use in eABS control start determination processing in Step S20 described later, or when the slip ratio S of the wheel estimated and calculated in Step S12 is equal to or less than a predetermined slip ratio Ss set in advance for use in the eABS control start determination processing in Step S20, the electronic control unit 26 determines to finish the execution of the eABS control. Then, when the electronic control unit 26 determines to finish the execution of the eABS control, the electronic control unit 26 sets the value of the eABS start flag f_eABS(n) to "OFF", and when the electronic control unit 26 determines not to finish the execution of the eABS control, the electronic control unit 26 maintains the value of the eABS start flag f_eABS(n) to "ON". Note that, regarding the finish determination for the eABS control, it is needless to say that the determination processing can be carried out based on other various determination conditions.

In Step S18, after the finish determination for the eABS control is made, the electronic control unit 26 proceeds to Step S19.

In Step S19, the electronic control unit 26 carries out an eABS control state flag calculation routine for calculating the eABS control state flag State_eABS. A detailed description is now given of the eABS control state flag calculation routine.

Figure 5:
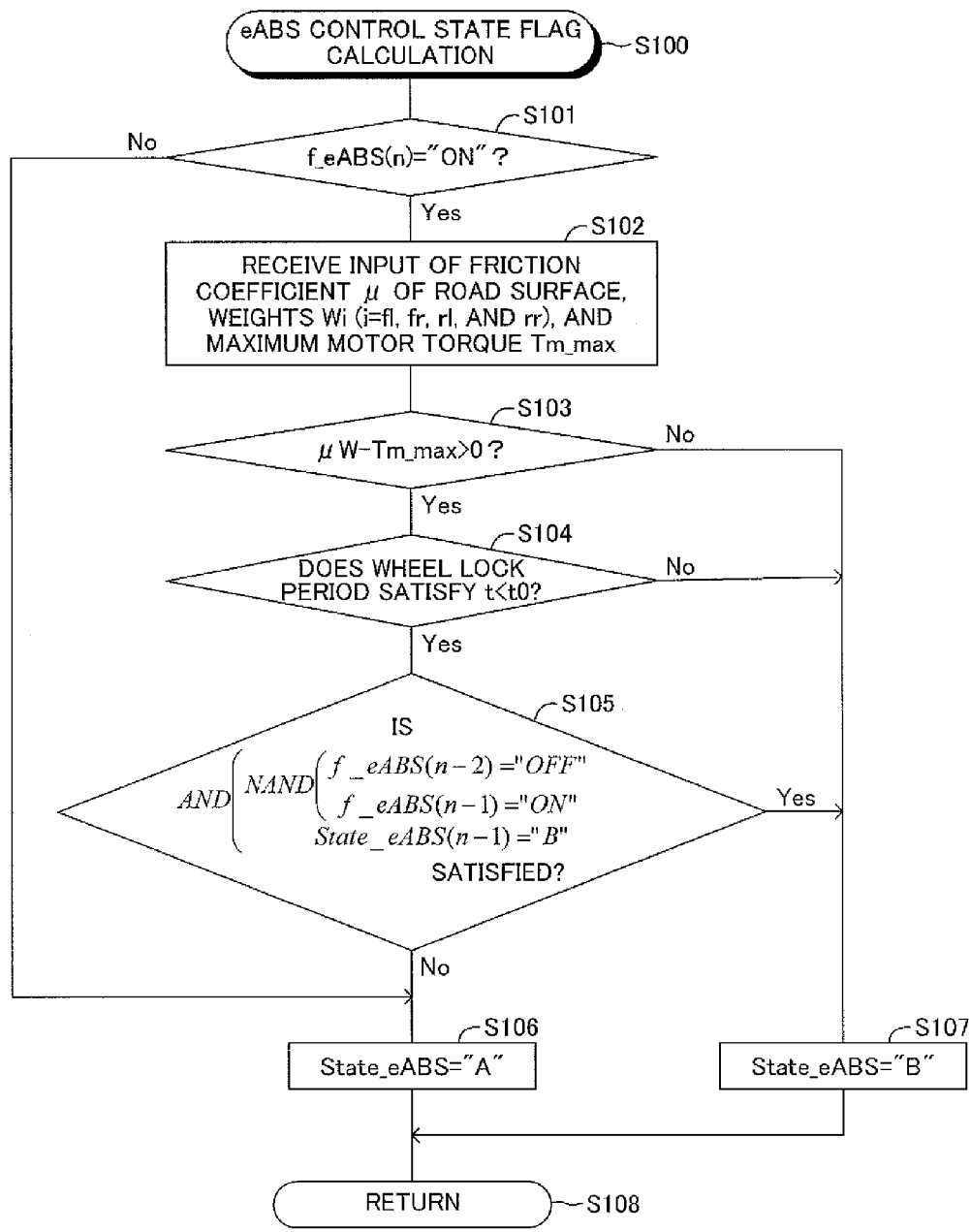
FIG. 5 is a flowchart illustrating an eABS control state flag calculation routine in the braking control program in FIG. 2.

As illustrated in FIG. 5, the eABS control state flag calculation routine starts execution in Step S100. Then, in Step S101, which follows, the electronic control unit 26 determines whether or not the value of the eABS start flag f_eABS(n) is "ON". In other words, when the value of the eABS start flag f_eABS(n) is "ON", the electronic control unit 26 makes a determination of "Yes", and proceeds to Step S102. On the other hand, when the value of the eABS start flag f_eABS(n) is not "ON", that is, the value of the eABS start flag f_eABS(n) is "OFF", the electronic control unit 26 makes a determination of "No", and proceeds to Step S106.

In Step S102, the electronic control unit 26 receives an input of the friction coefficient μ of the road surface estimated and calculated in Step S13 of the braking control program, and acquires and receives inputs of weights Wi (i=fl, fr, rl, and rr) at positions of the respective wheels 11 to 14. On this occasion, regarding the weights Wi (i=fl, fr, rl, and rr), the electronic control unit 26 acquires values set in advance, or acquires actual values detected by weight detection sensors (not shown). Note that, the weights Wi (i=fl, fr, rl, and rr) at the positions of the respective wheels 11 to 14 are hereinafter also simply referred to as the weight W at the wheel position. Moreover, the electronic control unit 26 receives an input of a maximum motor torque Tm_max which the in-wheel motors 15 to 18 can generate. Regarding the maximum motor torque Tm_max, a rated output of the in-wheel motors 15 to 18 set in advance may be input, or the outputs of the in-wheel motors 15 to 18 determined depending on an output performance of the electricity storage apparatus 20 may be input.

On this occasion, when the outputs of the in-wheel motors 15 to 18 set depending on the output performance of the electricity storage apparatus 20 are input as the maximum motor torque Tm_max, the maximum motor torque Tm_max changes depending on the output performance, that is, a charged amount of the electricity storage apparatus 20. Specifically, when the charged amount of the electricity storage apparatus 20 is high (the in-wheel motors 15 to 18 can generate a high maximum motor torque Tm_max), a regeneration performance of the in-wheel motors 15 to 18 decreases, that is, the in-wheel motors 15 to 18 can easily be operated in the power running state, and when the charged amount of the electricity storage apparatus 20 is low (the in-wheel motors 15 to 18 can generate a low maximum motor torque Tm_max), the driving performance of the in-wheel motors 15 to 18 decreases, that is, the in-wheel motors 15 to 18 can easily be operated in the regeneration state.

In this way, after the electronic control unit 26 receives the input of the friction coefficient μ of the road surface, the weights W at the wheel positions, and the maximum motor torque Tm_max, the electronic control unit 26 proceeds to Step S103. In Step S103, the electronic control unit 26 determines whether or not a relationship represented by Expression 1 is satisfied.

[Math. 1]

$$\mu W - Tm\_max > 0 \quad \text{(Expression 1)}$$

Note that, μW, which is a first term on the left side in Expression 1, represents a friction force generated between the wheel and the road surface, that is, a target braking force, and is hereinafter referred to as an ideal braking force μW.

In other words, when the maximum motor torque Tm_max is smaller than the ideal braking force μW as the target braking force, and the relationship represented by Expression 1 holds true, that is, the vehicle Ve is traveling on a high-μ road having a relatively high friction coefficient, the electronic control unit 26 makes a determination of "Yes", and proceeds to Step S104. On the other hand, when the maximum motor torque Tm_max is larger than the ideal braking force μW, and the relationship represented by Expression 1 does not hold true, that is, the vehicle Ve is traveling on a low-μ road having a relatively low friction coefficient, the electronic control unit 26 makes a determination of "No", and proceeds to Step S107.

In Step S104, the electronic control unit 26 uses the respective wheel speeds Vwi (i=fl, fr, rl, and rr) input in Step S11 and the estimated body speed Vb estimated (determined) in Step S12 of the braking control program to determine whether or not a duration t (the duration t is hereinafter referred to as "wheel locked period t") of the locked state generated on at least one wheel out of the left and right front wheels 11 and 12 and the left and right rear wheels 13 and 14 is less than a predetermined period t0 set in advance. In other words, when the wheel locked period t is less (shorter) than the predetermined period t0, that is, the wheel is on a high-μ road having a relatively large friction coefficient of the road surface, the electronic control unit 26 makes a determination of "Yes", and proceeds to Step S105. On the other hand, when the wheel locked period t is equal to or more (longer) than the predetermined period t0, that is, the wheel is on a low-μ road having a relatively small friction coefficient of the road surface, the electronic control unit 26 makes determination of "No", and proceeds to Step S107.

In Step S105, the electronic control unit 26 determines whether or not a condition represented by a logical operation of Expression 2 is satisfied.

[Math. 2]

$$AND \begin{pmatrix} NAND \begin{pmatrix} f\_eABS(n-2) = \text{"OFF"} \\ f\_eABS(n-1) = \text{"ON"} \end{pmatrix} \\ State\_eABS(n-1) = \text{"B"} \end{pmatrix} \quad \text{(Expression 2)}$$

The eABS control state flag State_eABS(n−1) having a value "B" in the condition represented by the logical operation of Expression 2 means that the eABS control state is in a state B as a description later given of Step S107.

In other words, when the condition represented by the logical operation of Expression 2 is satisfied, that is, the value of the eABS control state flag State_eABS is set to the state B (when the eABS control state has transitioned to the state B) in a state other than an initial state of the eABS control state described later, the electronic control unit 26 makes a determination of "Yes" in order to maintain the state B until the eABS control is finished, and proceeds to Step S107. On the other hand, as described later, when the value of the eABS control state flag is set to the state A in which the respective in-wheel motors 15 to 18 are operated in the regeneration state as the initial state of the eABS control state, and the condition represented by the logical operation of Expression 2 is not satisfied, the electronic control unit 26 makes a determination of "No", and proceeds to Step S106.

Figure 6:
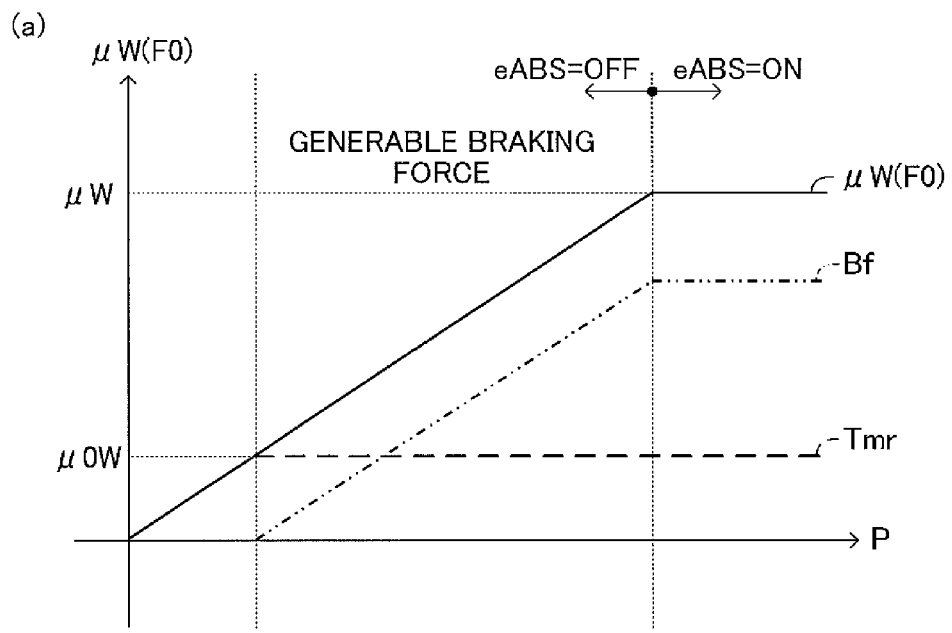
FIGS. 6(a) and 6(b) are charts illustrating relationship between a depressing force, and a friction braking force, a motor braking torque, and a motor driving torque depending on the eABS control state flag.
Figure 6:
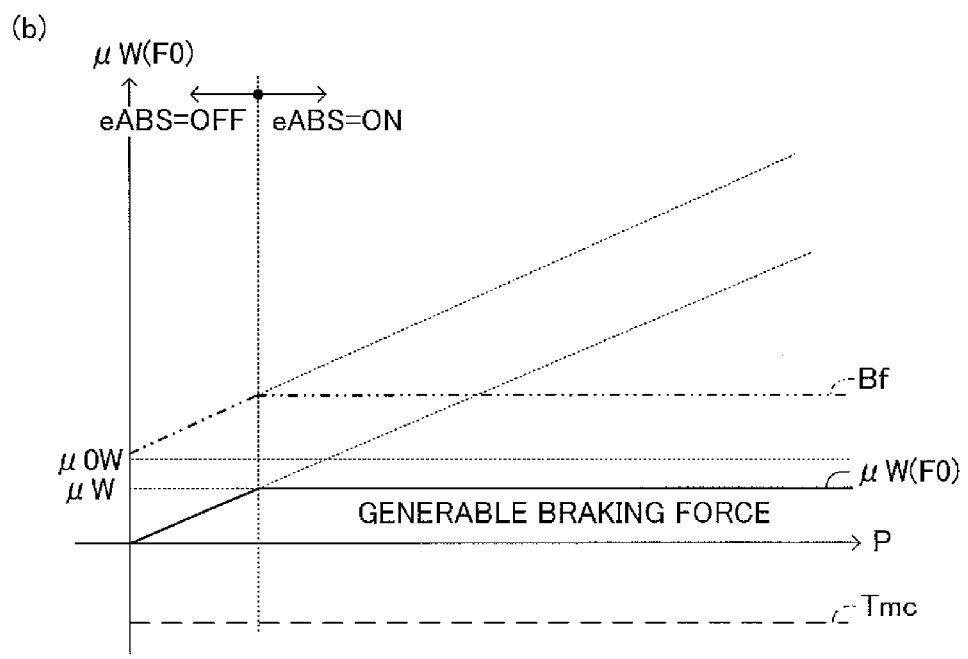

In Step S106, the value of the eABS control state flag State_eABS is set to "A" representing the state A as a first state in which the respective in-wheel motors 15 to 18 in the regeneration state generate the braking forces in the eABS control. In other words, in the state A, as illustrated in FIG. 6(a), during the eABS control, at least one of the respective in-wheel motors 15 to 18 cooperates with the respective friction brake mechanisms 21 to 24 to generate the ideal braking forces μW (required braking forces F0) on the respective wheels 11 to 14 in such a state that the braking forces are always generated by means of the regeneration control by the electronic control unit 26.

In Step S107, the value of the eABS control state flag State_eABS is set to "B" representing the state B as a second state in which the respective in-wheel motors 15 to 18 in the power running state generate the driving forces in the eABS control. In other words, in the state B, as illustrated in FIG. 6(b), during the eABS control, at least one of the respective in-wheel motors 15 to 18 cooperates with the respective friction brake mechanisms 21 to 24 to generate the ideal braking forces μW (required braking forces F0) on the respective wheels 11 to 14 in such a state that the driving forces are always generated by means of the power running control by the electronic control unit 26 in.

The value of the eABS control state flag State_eABS set in Step S106 or S107 are set to "B" as the initial state in principle as detailed later in a description of an eABS control initial state flag calculation routine.

In this way, when the electronic control unit 26 sets the value of the eABS control state flag State_eABS to "A" or "B" in Step S106 or S107, the electronic control unit 26 proceeds to Step S108, and finishes the execution of the eABS control state flag calculation routine. Then, the electronic control unit 26 returns to Step S19 of the braking control program, and proceeds to Step S20 of this program.

On the other hand, in Step S17 of the braking control program, when the eABS start flag f_eABS(n−1) is not set to "ON", and the electronic control unit 26 thus makes a determination of "No", the electronic control unit 26 carries out step processing in Step S20.

In Step S20, the eABS control is not presently carried out based on the determination processing in Step S17, and the electronic control unit 26 thus makes a determination of whether or not to start execution of the eABS control. Specifically, for example, when the estimated body speed Vb estimated in Step S12 is higher than the predetermined body speed Vbs set in advance, and when the slip ratio S of the wheel calculated in Step S12 is more than the predetermined slip ratio Ss, the electronic control unit 26 determines to start the execution of the eABS control. Then, when the electronic control unit 26 determines to start the execution of the eABS control, the electronic control unit 26 sets the value of the eABS start flag f_eABS(n) to "ON", and when the electronic control unit 26 determines not to start the execution of the eABS control, the electronic control unit 26 maintains the value of the eABS start flag f_eABS(n) to "OFF". Note that, regarding the execution start determination for the eABS control, it is needless to say that the determination processing can be carried out based on other various determination conditions.

In Step S20, after the start determination for the eABS control is made, the electronic control unit 26 proceeds to Step S21.

In Step S21, the electronic control unit 26 carries out an eABS control initial state flag calculation routine for calculating the initial state in the eABS control state. A detailed description is now given of the eABS control initial state calculation routine.

Figure 7:
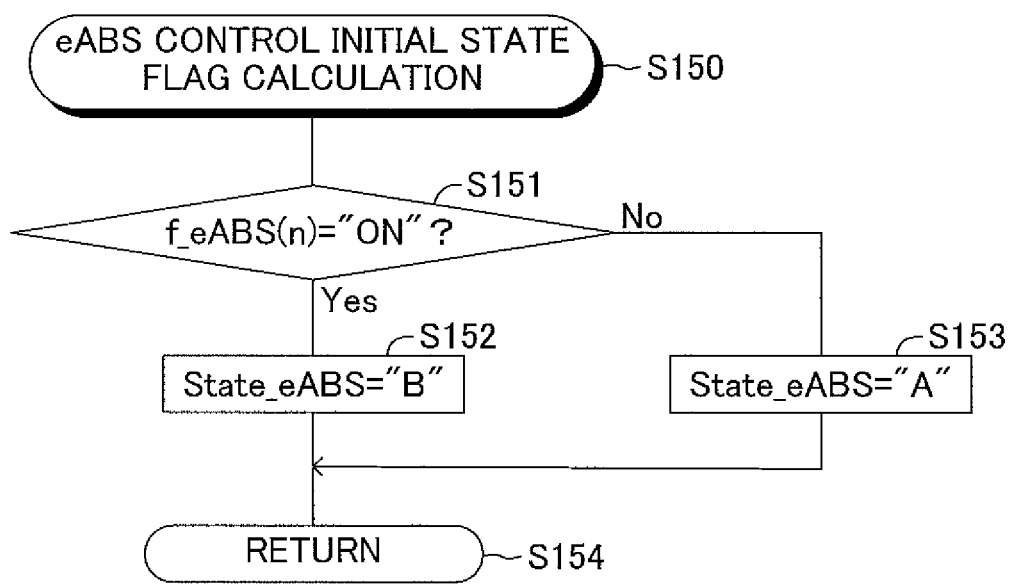
FIG. 7 is a flowchart illustrating an eABS control initial state flag calculation routine in the braking control program in FIG. 2.

The electronic control unit 26 executes the eABS control initial state flag calculation routine illustrated in FIG. 7, thereby enabling the control to start from the state B described above as the initial state of the eABS control in principle so that the eABS control is appropriately carried out even in a state where the friction coefficient μ of the road surface is extremely small (in a state of travel on a so-called extremely-low-μ road). A specific description is now given of the routine, and, in Step S150, the electronic control unit 26 starts the eABS control initial state flag calculation routine illustrated in FIG. 7. In S151, which follows, the electronic control unit 26 determines whether or not the value of the eABS start flag f_eABS(n) is "ON". In other words, when the value of the eABS start flag f_eABS(n) is "ON", the electronic control unit 26 makes a determination of "Yes", and proceeds to Step S152. On the other hand, when the value of the eABS start flag f_eABS(n) is not "ON", that is, the value of the eABS start flag f_eABS(n) is "OFF", and the eABS control is not carried out, the electronic control unit 26 makes a determination of "No", and proceeds to Step S153.

In Step S152, which is carried out when the value of the eABS start flag f_eABS(n) is "ON", the electronic control unit 26 sets the value of the eABS control state flag State_eABS in the initial state to "B", that is, the state B where the respective in-wheel motors 15 to 18 generate driving forces in the power running state in the eABS control. On the other hand, in Step S153 carried out when the value of the ABS start flag f_eABS(n) is "OFF", the electronic control unit 26 sets the value of the eABS control state flag State_eABS in the initial state to "A", that is, the state A where the respective in-wheel motors 15 to 18 generate braking forces in the regeneration state while the eABS control is not carried out.

As a result, in the initial state where the value of the eABS start flag f_eABS(n) is set to "ON" as a result of the execution of Step S20 of the braking control program, and the eABS control is started, the value of the eABS control state flag State_eABS is set to "B". Thus, the eABS control according to the present invention starts from the state B where the electronic control unit 26 brings the respective in-wheel motors 15 to 18 in the state of always generating the driving forces by means of the power-running control, and causes the respective friction brake mechanisms 21 to 24 to generate the friction braking forces, thereby generating the ideal braking forces μW on the respective wheels 11 to 14.

After the electronic control unit 26 carries out Step S152 or S153, the electronic control unit 26 proceeds to Step S154. Then, the electronic control unit 26 finishes the execution of the eABS control initial state flag calculation routine in Step S154, and returns to Step S21 of the braking control program.

In Step S21 of the braking control program, after the electronic control unit 26 carries out the eABS control initial state flag calculation routine, the electronic control unit 26 proceeds to Step S22.

In Step S22, the electronic control unit 26 calculates a distribution of the friction braking forces Bf by the respective friction brake mechanisms 21 to 24, and the motor torques (braking forces or driving forces) Tm by the respective in-wheel motors 15 to 18. In this case, the electronic control unit 26 calculates magnitudes (distribution) of the friction braking forces Bf by the respective friction brake mechanisms 21 to 24 and magnitudes (distribution) of the motor torques Tm by the respective in-wheel motors 15 to 18 with respect to the ideal braking forces μW (required braking forces F0) depending on the value of the eABS control state flag State_eABS set in Step S19 or S21, that is, the state A or state B of the control state of the eABS.

Specifically, when the value of the eABS control state flag State_eABS is "A", the electronic control unit 26 provides at least one of the in-wheel motors 15 to 18 which requires the eABS control with the regeneration control in the state A, thereby generating a motor braking torque Tmr, which is an electromagnetic braking force having a predetermined magnitude, as the motor torque Tm. As a result, the electronic control unit 26 calculates the friction braking force Bf (absolute value) in accordance with Expression 3 using the ideal braking force μW (absolute value) and the motor braking torque Tmr (absolute value).

[Math. 3]

$$Bf = \mu W - Tmr \qquad \text{(Expression 3)}$$

Note that, the motor braking torque Tmr in Expression 3 is set in advance as a braking torque to be generated on each of the in-wheel motors 15 to 18 by means of the regeneration control during the braking, and the magnitude thereof is set to a value less than the maximum motor torque Tm_max as described later.

Moreover, when the value of the eABS control state flag State_eABS is "B", the electronic control unit 26 provides at least one of the in-wheel motors 15 to 18 which requires the eABS control with the power running control in the state B, thereby generating a motor driving torque Tmc, which is an electromagnetic driving force having a predetermined magnitude, as the motor torque Tm. As a result, the electronic control unit 26 calculates the friction braking force Bf (absolute value) in accordance with Expression 4 using the ideal braking force μW (absolute value) and the motor driving torque Tmc (absolute value).

[Math. 4]

$$Bf = \mu W + Tmc \qquad \text{(Expression 4)}$$

Note that, the motor driving torque Tmc in Expression 4 is set in advance as a torque to be generated on each of the in-wheel motors 15 to 18 by means of power running control during the braking, and the magnitude thereof is set to be less than a torque (so-called creep torque) required for the in-wheel motors 15 to 18 to cause the vehicle Ve to travel by creep.

Figure 8:
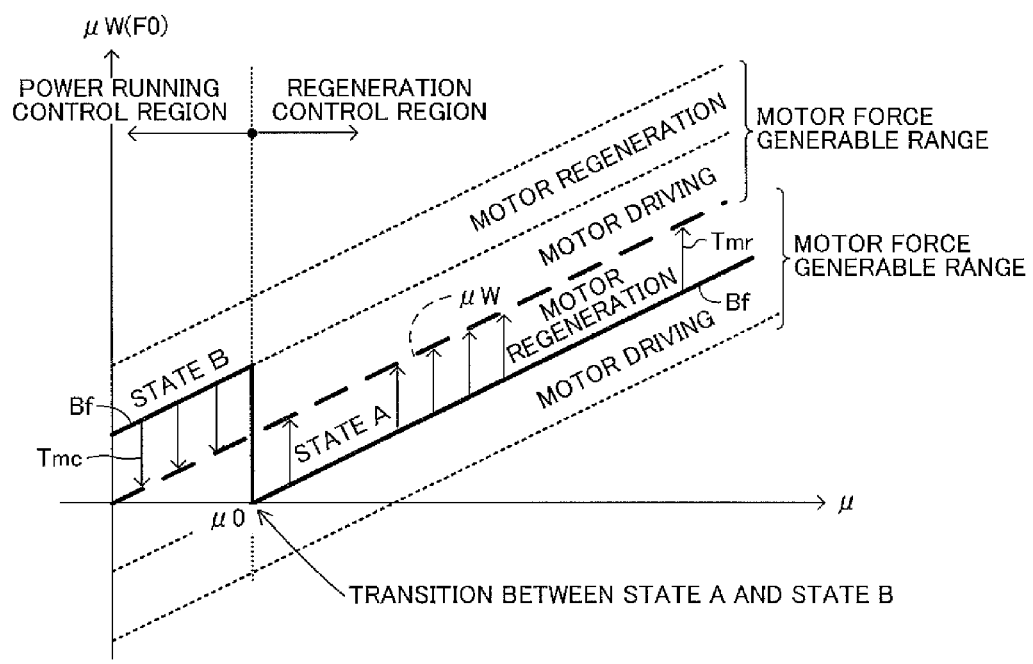
FIG. 8 is a chart illustrating a relationship between the friction coefficient of the road surface, and the friction braking force, the motor braking torque, and the motor driving torque, and a transition of the eABS control state caused by inversion between the motor braking torque and the motor driving torque.

Referring to FIG. 8, a description is now given of the friction braking force Bf calculated in accordance with Expression 3 or 4. As described above, when the value of the eABS control state flag State_eABS is "A", the respective in-wheel motor 15 to 18 generate the motor braking torques Tmr in the regeneration state, and the friction braking force Bf (absolute value) is thus calculated as a difference by subtracting the motor braking torque Tmr (absolute value) from the ideal braking force $\mu W$ (absolute value) in accordance with Expression 3. In other words, in the state A, as illustrated in FIG. 8, the ideal braking force $\mu W$ (absolute value) is realized as a sum of the friction braking force Bf (absolute value) and the motor braking torque Tmr (absolute value), which have the same acting direction.

On the other hand, as described above, when the value of the eABS control state flag State_eABS is "B", the respective in-wheel motors 15 to 18 generate the motor driving torques Tmc by means of the power running control, and the friction braking force Bf (absolute value) is thus calculated as a difference by adding the motor braking torque Tmc (absolute value) to the ideal braking force $\mu W$ (absolute value) in accordance with Expression 4. In other words, in the state B, as illustrated in FIG. 8, the ideal braking force $\mu W$ (absolute value) is realized as a sum of the friction braking force Bf (absolute value) and the motor driving torque Tmc (absolute value), which have the different acting directions.

Then, as exemplified in FIG. 8, when the friction coefficient $\mu$ of the road surface becomes less than a predetermined friction coefficient $\mu 0$, and the friction braking force Bf cannot be applied to the road surface, as apparent from the determination processing in Steps S103 and S104 of the eABS control state flag calculation routine described above, the state changes from the state A to the state B, and the friction braking force Bf is calculated in accordance with Expression 4 using the motor driving torque Tmc.

In other words, when the friction coefficient $\mu$ of the road surface, which changes moment by moment, reduces to $\mu 0$, the eABS control state switches from the state where the in-wheel motors 15 to 18 generate the motor braking torques Tmr to the state where the in-wheel motors 15 to 18 generate the motor driving torques Tmc, and transitions from the state A to the state B. Conversely, based on this configuration, when the friction coefficient $\mu$ of the road surface, which changes moment by moment, increases to exceed $\mu 0$, the eABS control state switches from the state where the in-wheel motors 15 to 18 generate the motor driving torques Tmc to the state where the in-wheel motors 15 to 18 generate the motor braking torques Tmr, and transitions from the state B to the state A. Then, as a result of the transition, the calculation of the friction braking force Bf changes from the calculation in accordance with Expression 4 using the motor driving torque Tmc to the calculation in accordance with Expression 3 using the motor braking torque Tmr.

Figure 9:
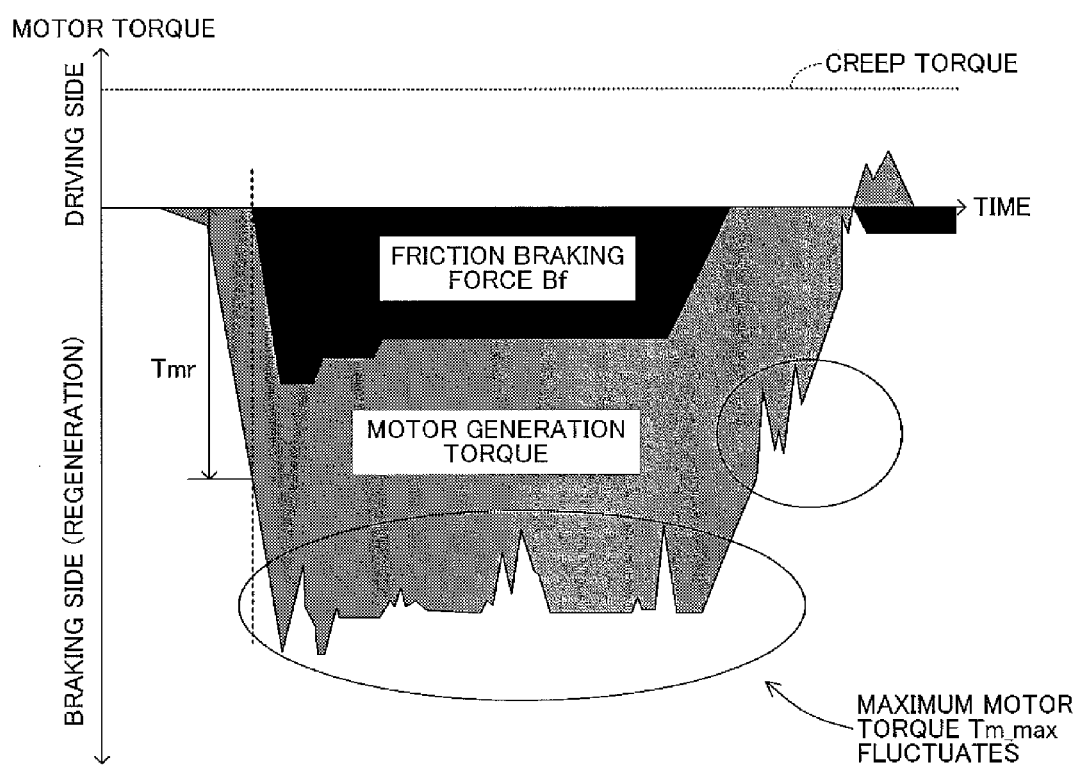
FIG. 9 is a chart illustrating a magnitude of the motor braking torque to be set.

By the way, as schematically illustrated in FIG. 9, the maximum motor torque Tm_max on the braking side generated by the regeneration control has such a characteristic as to generally change depending on a charged state of the electricity storage apparatus 20 and the like. In this case, for example, when the motor braking torque Tmr is set to the maximum motor torque Tm_max on the braking side, and the friction braking force Bf is calculated in accordance with Expression 3, the motor braking torque Tmr can be affected by the change in the maximum motor torque Tm_max. Therefore, the magnitude of the motor braking torque Tmr is set to a magnitude which is smaller than the maximum motor torque Tm_max, and restrains the change from occurring.

Moreover, the magnitude of the motor driving torque Tmc is set so as to be less than the creep torque required for the vehicle Ve to creep as described before. In this case, it is necessary to release the locked state of the left and right rear wheels 13 and 14 in priority to release of the locked state of the left and right front wheels 11 and 12 in order to quickly correct and stabilize a change in behavior of the vehicle Ve traveling on a road small in the friction coefficient $\mu$ of the road surface such as an extremely-low-$\mu$ road. Therefore, the magnitudes of the motor driving torques Tmc generated by the in-wheel motors 17 and 18 of the left and right rear wheels 13 and 14 are set to be less than the creep torque, and are set to be larger than the magnitudes of the motor driving torques Tmc generated by the in-wheel motors 15 and 16 of the left and right front wheels 11 and 12. In this case, specifically, for example, the magnitudes of the creep torques can be distributed to the left and right front wheels 11 and 12 and the left and right rear wheels 13 and 14 so as to be proportional to axle weights of the vehicle Ve.

Further, in the state B, the ideal braking force $\mu W$ (absolute value) is realized as the sum of the friction braking force Bf (absolute value) and the motor driving torque Tmc (absolute value), which have the different acting directions. In this case, the required braking forces F0 generated by the respective wheels 11 to 14 for braking the vehicle Ve can become relatively small. Therefore, a wheel which is other than the wheel generating the ideal braking force $\mu W$ in the state B, and generates the ideal braking force $\mu W$ in the state A can complement the braking force.

A specific description is given with an example of the left and right front wheels 11 and 12. For example, when the friction coefficient $\mu$ of the road surface at the left front wheel 11 is larger than the friction coefficient $\mu 0$, and the friction coefficient $\mu$ of the road surface at the right front wheel 12 is smaller than the friction coefficient $\mu 0$ (extremely-low-$\mu$ road), the electronic control unit 26 controls the braking force of the left front wheel 11 in the state A, and controls the braking force of the right front wheel 12 in the state B. In other words, the electronic control unit 26 activates the in-wheel motor 15 in the regeneration state, thereby generating the motor braking torque Tmr on the left front wheel 11, and calculates and determines the friction braking force Bf generated by the friction brake mechanism 21 in accordance with Expression 3. On the other hand, the electronic control unit 26 activates the in-wheel motor 16 in the power running state, thereby generating the motor driving torque Tmc on the right front wheel 12, and calculates and determines the friction braking force Bf generated by the friction brake mechanism 22 in accordance with Expression 4.

Figure 10:
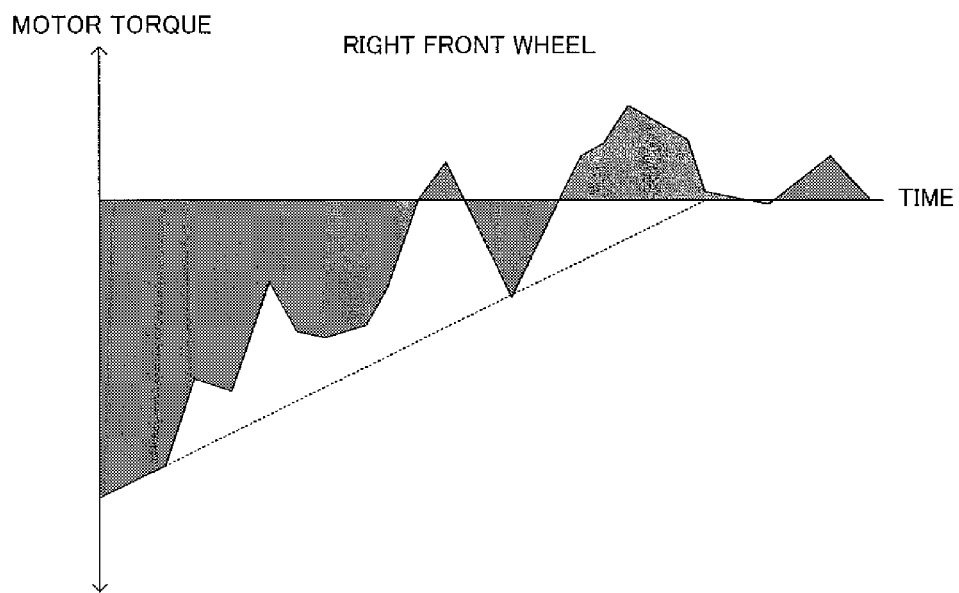
FIG. 10 is a chart illustrating complement by the motor braking torque on a left front wheel when the motor driving torque is generated on a right front wheel.
Figure 10:
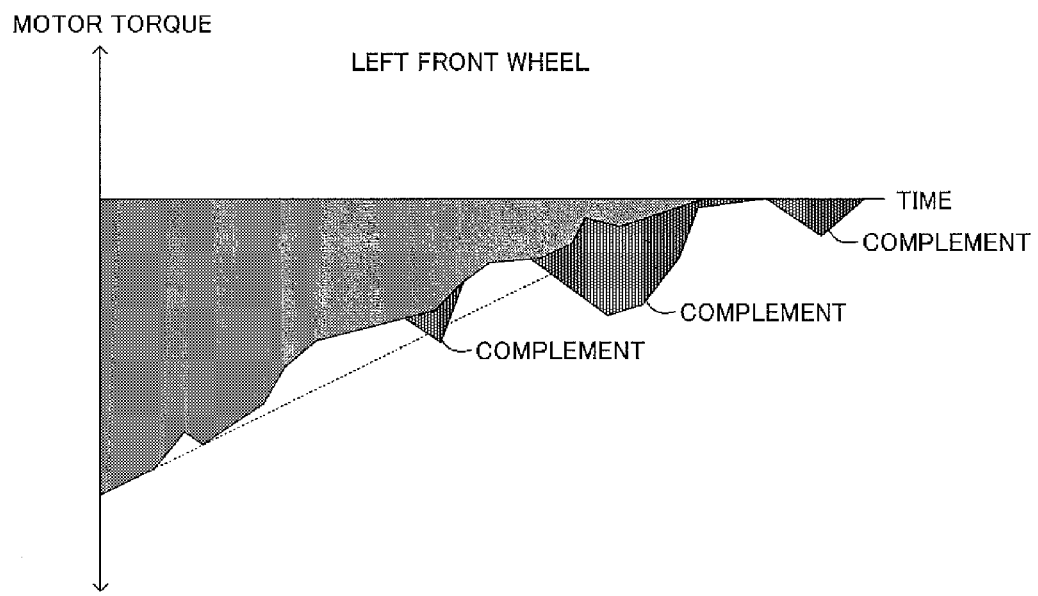

In this case, as illustrated in FIG. 10, the electronic control unit 26 carries out such a complement that the in-wheel motor 16 on the right front wheel 12 generates the motor driving torque Tmc, and, in correspondence to this, an amount corresponding to the motor driving torque Tmc generated by the in-wheel motor 16 is added to the motor braking torque Tmr generated by the in-wheel motor 15 on the left front wheel 11 so as to be larger by the amount, that is, so as to cancel the motor driving torque Tmc generated by the in-wheel motor 16. As a result, the sum of the required braking forces F0 to be generated by the left and right front wheels 11 and 12 to brake the vehicle Ve can be maintained.

When the motor braking torque Tmr is increased by complementing the amount corresponding to the motor driving torque Tmc, an upper limit may be provided for the magnitude of the torque to be added in consideration of a change in behavior in a lateral direction of the vehicle Ve. Moreover, the magnitude of the torque to be added can be determined by subtracting, for example, an amount of friction on a drive shaft and the like from the amount of the motor driving torque Tmc. Further, for example, in the state where the braking forces on all the wheels 11 to 14 are controlled in the state B, the sum of the required braking forces F0 to be generated for braking the vehicle Ve can be maintained by relatively increasing the friction braking forces Bf by the friction brake mechanisms 21 to 24 for the complement, or limiting the magnitudes of the motor driving torques Tmc.

Then, the electronic control unit 26 causes each of the in-wheel motors 15 to 18 to generate the determined motor braking torque Tmr or motor driving torque Tmc depending on the state A or the state B, and causes each of the friction brake mechanisms 21 to 24 to generate the friction braking force Bf, thereby generating the ideal braking force μW on each of the wheels 11 to 14, thereby imparting the required braking forces F0 determined in Step S14 to the vehicle Ve.

In other words, the electronic control unit 26 provides, via the inverter 19, each of the in-wheel motors 15 to 18 with the regeneration control or the power running control, thereby generating the motor braking torque Tmr or the motor driving torque Tmc on each of the in-wheel motors 15 to 18. Moreover, the electronic control unit 26 activates, via the brake actuator 25, each of the friction brake mechanisms 21 to 24, thereby generating the friction braking force Bf. As a result, the ideal braking force μW is generated on each of the left and right front wheels 11 and 12 and the left and right rear wheels 13 and 14, thereby imparting the required braking forces F0 determined in Step S14 to the vehicle Ve.

In this way, in Step S22, the electronic control unit 26 calculates and determines the motor braking torques Tmr or the motor driving torques Tmc, and the friction braking forces Bf, activates the respective in-wheel motors 15 to 18 and the respective friction brake mechanisms 21 to 24, and then proceeds to Step S23.

In Step S23, the electronic control unit 26 carries out a state transition cooperative activation control routine to activate the in-wheel motors 15 to 18 and the friction brake mechanisms 21 to 24, thereby cooperating the in-wheel motors 15 to 18 and the friction brake mechanisms 21 to 24 with each other when the eABS control state is transitioning. A detailed description is now given of the state transition cooperative activation control routine.

As described above, in Step S22, the electronic control unit 26 causes each of the in-wheel motors 15 to 18 to generate the motor braking torque Tmr or the motor driving torque Tmc determined depending on the state A or the state B, and causes each of the friction brake mechanisms 21 to 24 to generate the friction braking force Bf. As a result, the ideal braking forces μW are generated on the respective wheels 11 to 14 depending on the state A or the state B in the eABS control, thereby imparting the required braking forces F0 determined in Step S14 to the vehicle Ve.

By the way, when the eABS control state transitions, that is, the state A transitions to the state B, or the state B transitions to the state A, as illustrated in FIG. 8, the torque generation direction on each of the in-wheel motors 15 to 18 changes, and, as a result, the magnitude of the friction braking force Bf generated by each of the friction brake mechanisms 21 to 24 changes. Moreover, when the eABS control state transitions, the magnitude of each of the required braking forces F0, that is, the ideal braking forces μW determined in Step S14 can be changed. Then, when the changes occur, the driver may sense the changes, and may feel a sense of discomfort.

Figure 11:
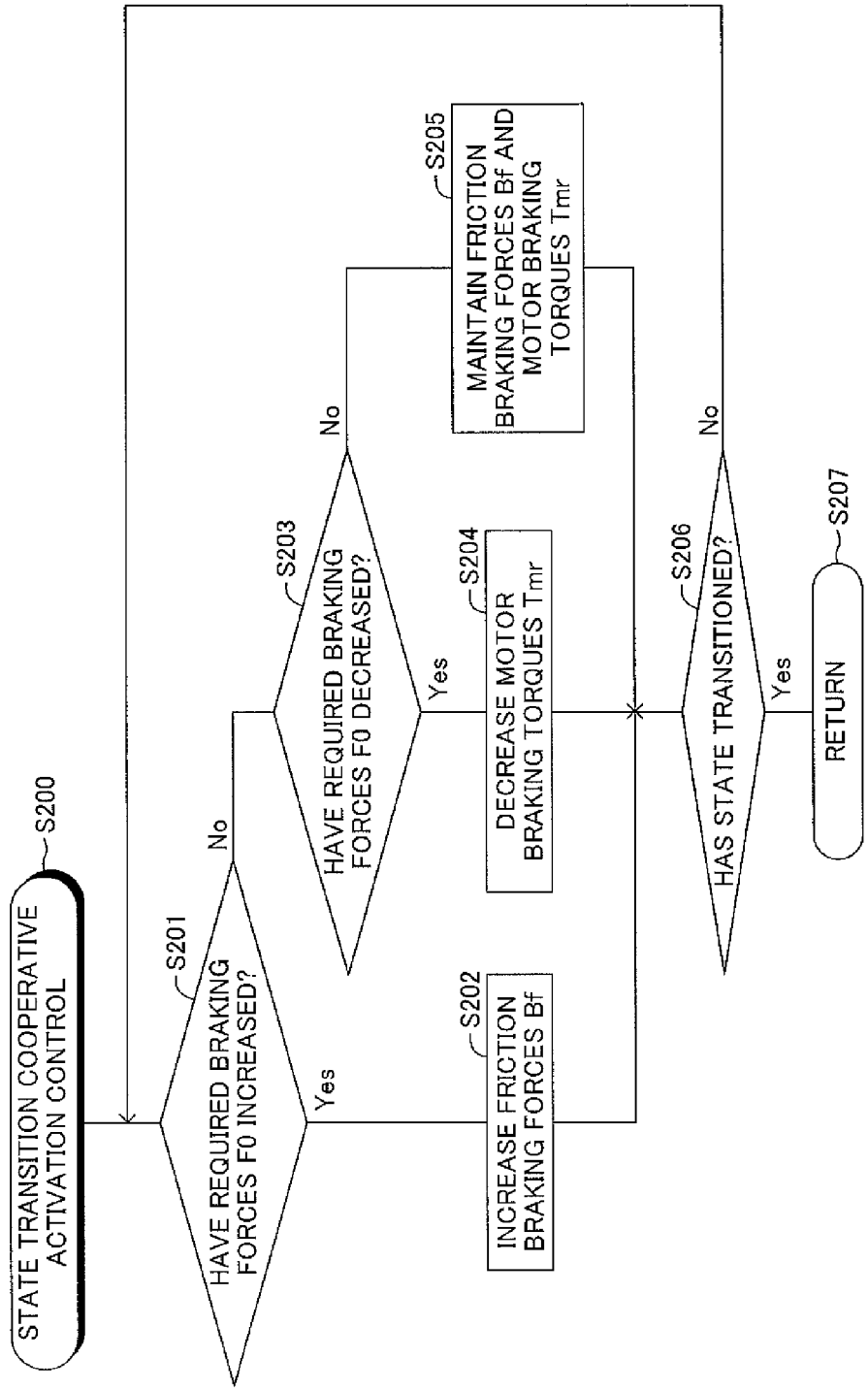
FIG. 11 is a flowchart illustrating a state transition cooperative activation control routine when a state transitions from a state A to a state B in the braking control program in FIG. 2 according to a first embodiment of the present invention.
Figure 12:
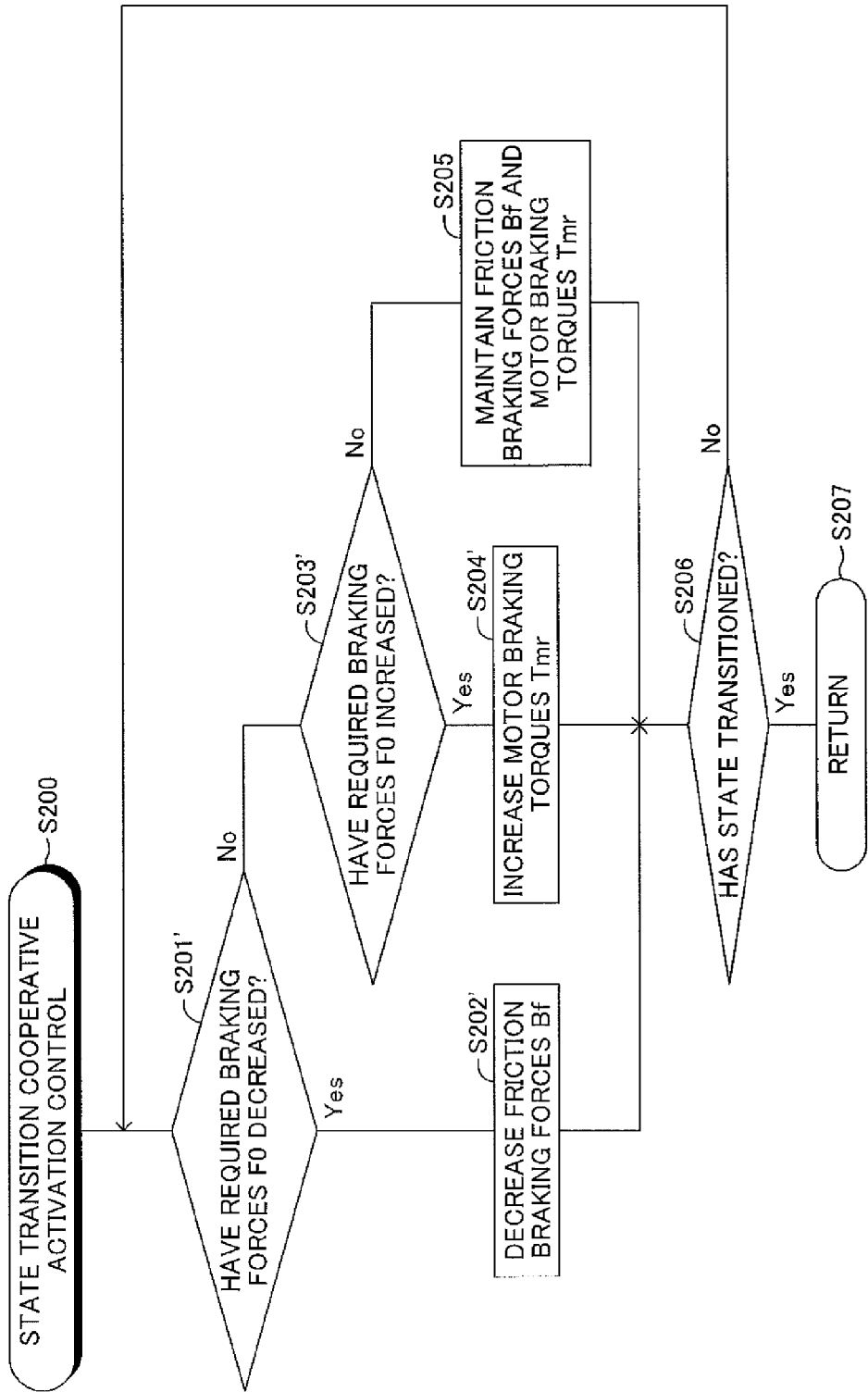
FIG. 12 is a flowchart illustrating the state transition cooperative activation control routine when the state transitions from the state B to the state A in the braking control program in FIG. 2 according to the first embodiment of the present invention.

Thus, the electronic control unit 26 executes the state transition cooperative activation control routine illustrated in FIGS. 11 and 12, thereby maintaining the change direction (that is, increase or decrease) of the motor braking torque Tmr or the motor driving torque Tmc of each of the in-wheel motors 15 to 18, and the change direction (that is, increase or decrease) of the friction braking force Bf by each of the friction brake mechanisms 21 to 24 in one direction when the eABS control state transitions. Then, while the electronic control unit 26 maintains the change direction (that is, increase or decrease) of the motor braking torque Tmr or the motor driving torque Tmc of each of the in-wheel motors 15 to 18, and the change direction (that is, increase or decrease) of the friction braking force Bf by each of the friction brake mechanisms 21 to 24 in one direction as described above, the electronic control unit 26 causes each of the left and right front wheels 11 and 12 and the left and right rear wheels 13 to 14 to generate the ideal braking force μW, thereby imparting the required braking forces F0 determined in Step S14 to the vehicle Ve. A specific description is now given of the state transition cooperative activation control routine illustrated in FIG. 11 executed when the eABS control state transitions from the state A to the state B.

When it is necessary to cause the eABS control state to transition from the state A to the state B based on the result of the eABS control state flag calculation routine executed in Step 19 or the result of the eABS initial state flag calculation routine executed in Step S21 in the braking control program, the electronic control unit 26 starts the state transition cooperative activation control routine illustrated in FIG. 11 in Step S200. Then, the electronic control unit 26 determines whether or not the required braking forces F0 (or the ideal braking forces μW) have increased in Step S201, which follows. In other words, for example, when the depressing force P input to the brake pedal B by the driver has increased based on the input from the brake sensor 27, as illustrated in FIG. 4, the required braking forces F0 in the proportional relationship with the depressing force P increase. Therefore, the electronic control unit 26 makes a determination of "Yes", and proceeds to Step S202. On the other hand, when the required braking forces F0 have not increased, the electronic control unit 26 makes a determination of "No", and proceeds to Step S203.

In Step S202, the electronic control unit 26 increases only the magnitude of the friction braking forces Bf generated on the respective friction brake mechanisms 21 to 24 in response to the increase in the required braking forces F0, thereby generating increased required braking forces F0, that is, ideal braking forces μW. On this occasion, as described above, when the eABS control state is caused to transition from the state A to the state B, the generation direction of the motor torques generated on the respective in-wheel motors 15 to 18 needs to be changed, specifically, the generation state of the motor braking torques Tmr needs to be successively changed (inverted) to the generation direction of the motor driving torques Tmc. On the other hand, even when the eABS control state is caused to transition from the state A to the state B, the respective friction brake mechanisms 21 to 24 are caused to generate the friction braking forces Bf acting in the same direction.

Thus, when the eABS control state is caused to transition from the state A to the state B, and the required braking forces F0 increase, the electronic control unit 26 accordingly changes the magnitudes of the friction braking forces Bf by the respective friction brake mechanisms 21 to 24 only in the increasing direction while maintaining the state where the in-wheel motors 15 to 18 generate the motor braking torques Tmr. As a result, when the required braking forces F0 increase, the generation direction of the motor torques (that is, the motor braking torques Tmr) by the respective in-wheel motors 15 to 18 does not change, and only the magnitudes of the friction braking forces Bf by the respective friction brake mechanisms 21 to 24 change in the increasing direction.

Then, the electronic control unit 26 provides the respective in-wheel motors 15 to 18 with the regeneration control via the inverter 19 so as to maintain the motor braking torques Tmr, and activates the respective friction brake mechanisms 21 to 24 via the brake actuator 25 so as to increase the magnitudes of the friction braking forces Bf in response to the increase amounts of the required braking forces F0 (ideal braking forces μW). As a result, the ideal braking forces μW are generated respectively on the left and right front wheels 11 and 12 and the left and right rear wheels 13 and 14, thereby imparting the required braking forces F0 required to increase for the vehicle Ve. Then, the electronic control unit 26 sets the direction so as to increase the magnitudes of the friction braking forces Bf by the respective friction brake mechanisms 21 to 24, and proceeds to Step S206.

On the other hand, when the required braking forces F0 have not increased in Step S201, the electronic control unit 26 carries out Step S203.

In Step S203, the electronic control unit 26 determines whether or not the required braking forces F0 have decreased. In other words, for example, when the depressing force P input to the brake pedal B by the driver has decreased based on the input from the brake sensor 27, as described above, the required braking forces F0 in the proportional relationship with the depressing force P decrease. Therefore, the electronic control unit 26 makes a determination of "Yes", and proceeds to Step S204. On the other hand, when the required braking forces F0 have not decreased, the electronic control unit 26 makes determination of "No", and proceeds to Step S205.

In Step S204, the electronic control unit 26 generates the decreased required braking forces F0, that is, the ideal braking forces μW only by decreasing the motor braking torques Tmr currently generated by means of the regeneration control by the respective in-wheel motors 15 to 18, that is, successively increasing the motor driving torques Tmc by means of the power running control in response to the decrease in the required braking forces F0. In other words, when the eABS control state is caused to transition from the state A to the state B, and the required braking forces F0 decrease, the electronic control unit 26 accordingly maintains the magnitudes of the friction braking forces Bf by the friction brake mechanisms 21 to 24 while successively changing the generation direction of the motor torques by the respective in-wheel motors 15 to 18 to the generation direction of the motor driving torques Tmc, that is, to the direction of decreasing the magnitudes of the motor braking torques Tmr currently generated by the respective in-wheel motors 15 to 18. As a result, when the eABS control state is caused to transition from the state A to the state B, and the required braking forces F0 decrease, the magnitudes of the friction braking forces Bf by the respective friction brake mechanisms 21 to 24 do not change, and only the magnitudes of the motor braking torques Tmr by the respective in-wheel motors 15 to 18 change in the decreasing direction (the direction in which the magnitudes of the motor driving torques Tmc relatively increase).

Then, the electronic control unit 26 provides, via the inverter 19, the respective in-wheel motors 15 to 18 with the regeneration control to decrease the magnitudes of the motor braking torques Tmr, that is, provides the respective in-wheel motors 15 to 18 with the power running control to relatively increase the magnitudes of the motor driving torques Tmc in response to the decreases in the required braking forces F0 (ideal braking forces μW), and activates, via the brake actuator 25, the respective friction brake mechanisms 21 to 24 so as to maintain the magnitudes of the friction braking forces Bf. As a result, the ideal braking forces μW are generated respectively on the left and right front wheels 11 and 12 and the left and right rear wheels 13 and 14, thereby imparting the required braking forces F0 required to decrease to the vehicle Ve. Then, the electronic control unit 26 sets the direction so as to decrease the magnitudes of the motor braking torques Tmr by the respective in-wheel motors 15 to 18, and proceeds to Step S206.

Further, when, in Step S201, the required braking forces F0 have not increased, and, in Step S203, the required braking forces F0 have not decreased, that is, the required braking forces F0 do not need to increase or decrease, the electronic control unit 26 carries out Step S205. In other words, in Step S205, the electronic control unit 26 does not change and maintains both of the magnitudes of the motor braking torques Tmr (motor driving torques Tmc) by the respective in-wheel motors 15 to 18, and the magnitudes of the friction braking forces Bf by the respective brake mechanisms 21 to 24. Then, the electronic control unit 26 proceeds to Step S206.

In Step S206, the electronic control unit 26 determines whether or not the eABS control state has transitioned from the state A to the state B. In other words, for example, as illustrated in FIG. 8, when the friction coefficient μ of the road surface decreases below the predetermined friction coefficient μ0, and the electronic control unit 26 can no longer impart the friction braking forces Bf to the road surface in the state A, as apparent from the determination processing in Steps S103 and S104 in the eABS control state flag calculation routine, the eABS control state has transitioned from the state A to the state B. Therefore, the electronic control unit 26 makes a determination of "Yes", and proceeds to Step S207. On the other hand, when the eABS control state has not transitioned from the state A to the state B, the electronic control unit 26 makes a determination of "No". Then, the electronic control unit 26 repeats the respective pieces of the step processing in and after Step S201 until the eABS control state transitions from the state A to the state B, that is, the determination of "Yes" is made in Step S206.

In this way, when, in Step S206, the electronic control unit 26 determines that the eABS control state has transitioned from the state A to the state B, the electronic control unit 26 proceeds to Step S207, and finishes the execution of the state transition cooperative activation control routine. Then, the electronic control unit 26 again returns to Step S23 of the braking control program.

A description is now given of the state transition cooperative activation control routine illustrated in FIG. 12 executed when the eABS control state transitions from the state B to the state A. In this case, when it is necessary to cause the eABS control state to transition from the state B to the state A as a result of the eABS control state flag calculation routine executed in Step S19 in the braking control program, the electronic control unit 26 starts the state transition cooperative activation control routine illustrated in FIG. 12 in Step S200. On this occasion, the state transition cooperative activation control routine illustrated in FIG. 12 is different merely in such a point that the content of the step processing in Steps S201 to S204 of the state transition cooperative activation control routine illustrated in FIG. 11 is changed to Steps S201' to S204' in response to the state transition from the state B to the state A.

Specifically, in such a state that the eABS control state is caused to transition from the state B to the state A, as illustrated in FIG. 12, in Step S201', the electronic control unit 26 determines whether or not the required braking forces F0 have decreased. In other words, for example, when the depressing force P input to the brake pedal B by the driver has decreased based on the input from the brake sensor 27, as described above, the required braking forces F0 decrease. Therefore, the electronic control unit 26 makes a determination of "Yes", and proceeds to Step S202'. On the other hand, when the required braking forces F0 have not decreased, the electronic control unit 26 makes a determination of "No", and proceeds to Step S203'.

In Step S202', the electronic control unit 26 decreases only the friction braking forces Bf generated on the respective friction brake mechanisms 21 to 24 in response to the decrease in the required braking forces F0, thereby generating decreased required braking forces F0, that is, ideal braking forces μW. In other words, when the eABS control state is caused to transition from the state B to the state A, and the required braking forces F0 decrease, the electronic control unit 26 accordingly changes the magnitudes of the friction braking forces Bf by the respective friction brake mechanisms 21 to 24 only in the decreasing direction while maintaining the state where the in-wheel motors 15 to 18 generate the motor driving torques Tmc or the motor braking torques Tmr. As a result, when the required braking forces F0 decrease, the magnitudes of the motor torques (that is, the motor driving torques Tmc or the motor braking torques Tmr) by the respective in-wheel motors 15 to 18 do not change, and only the magnitudes of the friction braking forces Bf by the respective friction brake mechanisms 21 to 24 change in the decreasing direction.

Then, the electronic control unit 26 provides the respective in-wheel motors 15 to 18 with the power running control or the regeneration control via the inverter 19 so as to maintain the motor torques, and activates the respective friction brake mechanisms 21 to 24 via the brake actuator 25 so as to decrease the magnitudes of the friction braking forces Bf in response to the decrease amounts of the required braking forces F0 (ideal braking forces μW). As a result, the ideal braking forces μW are generated respectively on the left and right front wheels 11 and 12 and the left and right rear wheels 13 and 14, thereby imparting the required braking forces F0 required to decrease for the vehicle Ve. Then, the electronic control unit 26 sets the direction so as to decrease the magnitudes of the friction braking forces Bf by the respective friction brake mechanisms 21 to 24, and proceeds to Step S206.

On the other hand, when the required braking forces F0 have not decreased in Step S201', the electronic control unit 26 carries out Step S203'.

In Step S203', the electronic control unit 26 determines whether or not the required braking forces F0 have increased. In other words, for example, when the depressing force P input to the brake pedal B by the driver has increased based on the input from the brake sensor 27, as described above, the required braking forces F0 increase. Therefore, the electronic control unit 26 makes determination of "Yes", and proceeds to Step S204'. On the other hand, when the required braking forces F0 have not increased, the electronic control unit 26 makes determination of "No", and proceeds to Step S205.

In Step S204', the electronic control unit 26 generates the increased required braking forces F0, that is, the ideal braking forces μW only by decreasing the motor driving torques Tmc currently generated by means of the power running control by the respective in-wheel motors 15 to 18 in response to the state B, that is, successively increasing the motor braking torques Tmr by means of the regeneration control in response to the increase in the required braking forces F0.

In other words, when the eABS control state is caused to transition from the state B to the state A, and the required braking forces F0 increase, the electronic control unit 26 accordingly maintains the magnitudes of the friction braking forces Bf by the friction brake mechanisms 21 to 24 while successively changing the generation direction of the motor torques by the respective in-wheel motors 15 to 18 to the generation direction of the motor braking torques Tmr, that is, to the direction of decreasing the magnitudes of the motor driving torques Tmc currently generated by the respective in-wheel motors 15 to 18. As a result, when the eABS control state is caused to transition from the state B to the state A, and the required braking forces F0 increase, the magnitudes of the friction braking forces Bf by the respective friction brake mechanisms 21 to 24 do not change, and only the magnitudes of the motor driving torques Tmc by the respective in-wheel motors 15 to 18 change in the decreasing direction (the direction in which only the magnitudes of the motor braking torques Tmr relatively increase).

Then, the electronic control unit 26 provides, via the inverter 19, the respective in-wheel motors 15 to 18 with the power running control to decrease the magnitudes of the motor braking torques Tmr, that is, provides the respective in-wheel motors 15 to 18 with the regeneration control to relatively increase the magnitudes of the motor braking torques Tmr in response to the increases in the required braking forces F0 (ideal braking forces μW), and activates, via the brake actuator 25, the respective friction brake mechanisms 21 to 24 so as to maintain the magnitudes of the friction braking forces Bf. As a result, the ideal braking forces μW are generated respectively on the left and right front wheels 11 and 12 and the left and right rear wheels 13 and 14, thereby imparting the required braking forces F0 required to increase to the vehicle Ve. As described above, the electronic control unit 26 sets the direction so as to decrease the magnitudes of the motor driving torques Tmc by the respective in-wheel motors 15 to 18, and proceeds to Step S206.

Then, when, in Step S206, the electronic control unit 26 determines that the eABS control state has transitioned from the state B to the state A, the electronic control unit 26 proceeds to Step S207, and finishes the execution of the state transition cooperative activation control routine. Then, the electronic control unit 26 again returns to Step S23 of the braking control program.

Figure 13:
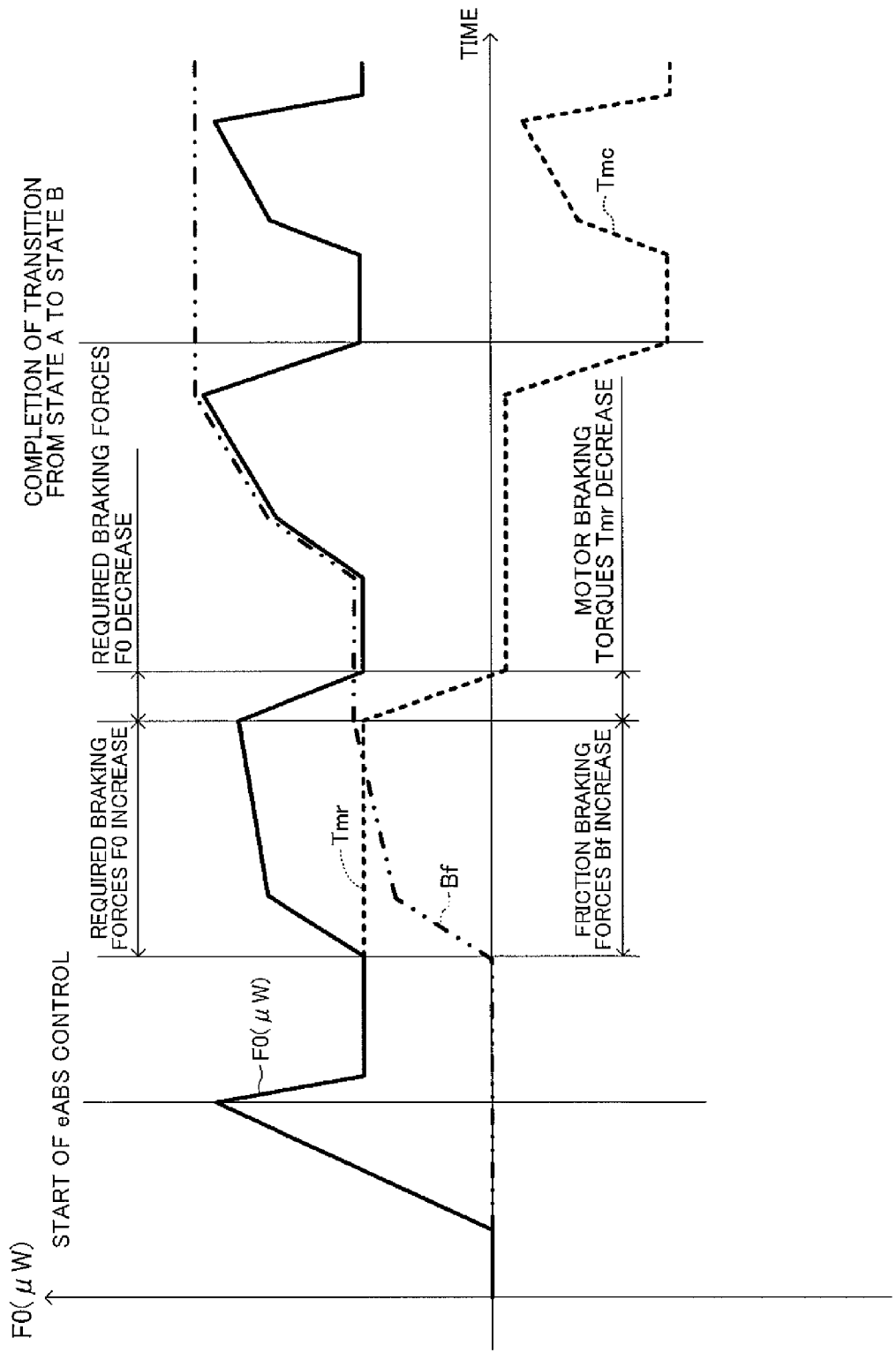
FIG. 13 is a time chart illustrating temporal changes in the required braking force (ideal braking force), the friction braking force, the motor braking torque, and the motor driving torque when the state transitions from the state A to the state B.
Figure 14:
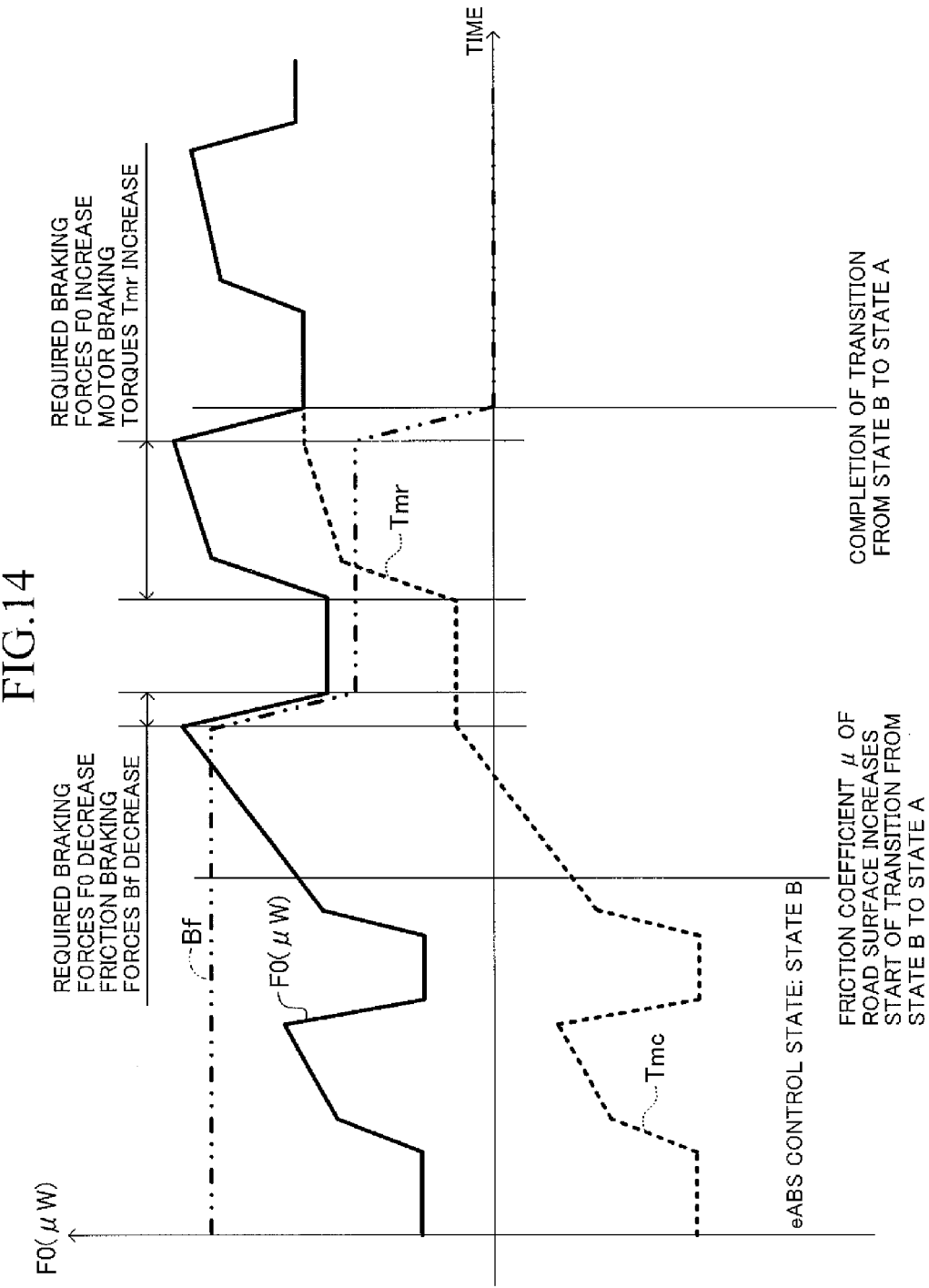
FIG. 14 is a time chart illustrating temporal changes in the required braking force (ideal braking force), the friction braking force, the motor driving torque, and the motor braking torque when the state transitions from the state B to the state A.

Referring to FIGS. 13 and 14, a description is now given of activations when the electronic control unit 26 executes the state transition cooperative activation control routine illustrated in FIG. 11 or 12. FIG. 13 is a time chart schematically illustrating an activation when the eABS control state is caused to transition from the state A to the state B, and the electronic control unit 26 executes the state transition cooperative activation control routine illustrated in FIG. 11, and FIG. 14 is a time chart schematically illustrating an activation when the eABS control state is caused to transition from the state B to the state A, and the electronic control unit 26 executes the state transition cooperative activation control routine illustrated in FIG. 12.

First, referring to FIG. 13, a description is given of the case where the eABS control state transitions from the state A to the state B. When the driver is not carrying out the depressing operation on the brake pedal B, the electronic control unit 26 carries out the step processing in Steps S10 to S16 and Step S24 of the braking control program. As a result, the electronic control unit 26 calculates the required braking forces F0 (ideal braking forces μW) as "0", determines that the brake is OFF, sets the value of the eABS start flag f_eABS (n) to "OFF", and sets the value of the eABS control state flag State_eABS to "A". Thus, when the driver is not operating the brake pedal B, that is, the brake is OFF, as illustrated in FIG. 13, the required braking forces F0 (ideal braking forces μW), the friction braking forces Bf, and the motor braking torques Tmr (motor driving torques Tmc) are respectively maintained to "0".

In this state, when the driver carries out the depressing operation on the brake pedal B, the electronic control unit 26 carries out the respective pieces of step processing in Steps S10 to S23 of the braking control program. As a result, before the eABS control is started, as illustrated in FIG. 13, the electronic control unit 26, for example, maintains the friction braking forces Bf by the respective friction brake mechanisms 21 to 24 approximately "0", and uniformly increases the required braking forces F0 (ideal braking forces μW) while providing, via the inverter 19, the respective in-wheel motors 15 to 18 with the regeneration control, thereby increasing the motor braking torques Tmr.

Then, when the required braking forces F0 (ideal braking forces μW) increase as a result of continuation of the depressing operation on the brake pedal B by the driver, the electronic control unit 26 starts the eABS control. Then, the electronic control unit 26 carries out Steps S103 to S106 of the eABS control state flag calculation routine in Step 19 of the braking control program, thereby setting the value of the eABS control state flag State_eABS to "A", and maintains the state A as the eABS control state on a high-μ road having a friction coefficient μ of the road surface larger than the friction coefficient μ0.

On this occasion, the electronic control unit 26 can periodically change the magnitudes of the motor braking torques Tmr generated by the respective in-wheel motors 15 to 18 by means of the regeneration control in the state A, which is not illustrated. Moreover, the electronic control unit 26 can also periodically change, via the brake actuator 25, the magnitudes of the friction braking forces Bf generated by the respective friction brake mechanisms 21 to 24 in the state A. As a result, the required braking forces F0 (ideal braking forces μW) in the state A periodically change depending on (in synchronous with) the periodical change of the magnitudes of the motor braking torques Tmr and the magnitudes of the friction braking forces Bf. Thus, the magnitudes of the required braking forces F0 (ideal braking forces μW) can periodically be increased or decreased, and the lock state of each of the wheels 11 to 14 can be effectively prevented.

In this state, when the friction coefficient μ of the road surface changes, for example, friction forces between the road surfaces and the respective wheels 11 to 14 decrease, and thus the eABS control state transitions from the state A to the state B. Thus, the electronic control unit 26 carries out the state transition cooperative activation control routine illustrated in FIG. 11 in Step S23 of the braking control program.

In other words, as illustrated in FIG. 13, in the state where the required braking forces F0 (ideal braking forces μW) increase, the electronic control unit 26 carries out Step S201 and Step S202 of the state transition cooperative activation control routine, thereby increasing the magnitudes of the friction braking forces Bf, and maintaining the magnitudes of the motor braking torques Tmr constant. In other words, when the eABS control state is still the state A, and the required braking forces F0 (ideal braking forces μW) increase, the electronic control unit 26 responds to the increase by increasing only the magnitudes of the friction braking forces Bf.

On the other hand, as illustrated in FIG. 13, in the state where the required braking forces F0 (ideal braking forces μW) decrease, the electronic control unit 26 carries out Steps S201, S203, and S204 of the state transition cooperative activation control routine, thereby decreasing the magnitudes of the motor braking torques Tmr, and maintaining the magnitudes of the friction braking forces Bf constant. In other words, in the state where the eABS control state transitions from the state A to the state B, the electronic control unit 26 decreases only the magnitudes of the motor braking torques Tmr to respond to the decrease in the required braking forces F0 (ideal braking forces μW).

Then, for example, when the friction coefficient μ of the road surface decreases to the friction coefficient μ0, in Step S107, the electronic control unit 26 sets, based on the determination is Step S103 or S104 of the eABS control state flag calculation routine, the value of the eABS control state flag State_eABS to "B" on an extremely-low-μ road having an extremely small friction coefficient μ of the road surface, thereby causing the eABS control state to transition from the state A to the state B. As illustrated in FIG. 13, as a result of the transition from the state A to the state B, the electronic control unit 26 provides, via the inverter 19, the respective in-wheel motors 15 to 18 with the power running control, thereby generating the motor driving torques Tmc. As illustrated in FIG. 13, as a result, when the eABS control state transitions to the state B, the electronic control unit 26 causes the respective in-wheel motors 15 to 18 to generate the motor driving torques Tmc by means of the power running control, thereby generating the required braking forces F0 (ideal braking forces μW) while maintaining the friction braking forces Bf substantially constant at predetermined magnitudes in response to the state B.

On this occasion, the electronic control unit 26 can periodically change the magnitudes of the motor driving torques Tmc generated by the respective in-wheel motors 15 to 18 by means of the power running control in the state B, which is not illustrated. Moreover, the electronic control unit 26 can also periodically change, via the brake actuator 25, the magnitudes of the friction braking forces Bf generated by the respective friction brake mechanisms 21 to 24 also in the state B. As a result, the required braking forces F0 (ideal braking forces μW) in the state B periodically change depending on (in synchronous with) the periodical change of the magnitudes of the motor driving torques Tmc and the magnitudes of the friction braking forces Bf. Thus, the magnitudes of the required braking forces F0 (ideal braking forces μW) can periodically be increased or decreased, and the lock state of each of the wheels 11 to 14 can be effectively prevented.

Referring to FIG. 14, a description is now given of the case where the eABS control state is caused to transition from the state B to the state A. As described above, for example, on the extremely-low-μ road having the friction coefficient μ of the road surface decreased to the friction coefficient μ0, the electronic control unit 26 sets the value of the eABS control state flag State_eABS to "B" based on the determination in Step S103 or S104 of the eABS control state flag calculation routine, thereby causing the eABS control state to transition from the state A to the state B. Then, when the eABS control state is the state B, as illustrated in FIG. 14, the electronic control unit 26 maintains the friction braking forces Bf constant, while increasing/decreasing the magnitudes of the motor driving torques Tmc in response to a decrease/increase of the required braking forces F0 (ideal braking forces μW).

In this state, when the friction coefficient μ of the road surface increased, for example, friction forces between the road surfaces and the respective wheels 11 to 14 increase, and thus the eABS control state transitions from the state B to the state A. Thus, the electronic control unit 26 carries out the state transition cooperative activation control routine illustrated in FIG. 12 in Step S23 of the braking control program.

In other words, as illustrated in FIG. 14, in the state where the required braking forces F0 (ideal braking forces μW) decrease, the electronic control unit 26 carries out Step S201' and Step S202' of the state transition cooperative activation control routine, thereby decreasing the magnitudes of the friction braking forces Bf, and maintaining the magnitudes of the motor braking torques Tmr constant. In other words, when the eABS control state is still the state B, and the required braking forces F0 (ideal braking forces μW) decrease, the electronic control unit 26 responds to the decrease by decreasing only the magnitudes of the friction braking forces Bf.

On the other hand, as illustrated in FIG. 14, in the state where the required braking forces F0 (ideal braking forces μW) increase, the electronic control unit 26 carries out Steps S201', S203', and S204' of the state transition cooperative activation control routine, thereby increasing the magnitudes of the motor braking torques Tmr (or decreasing the magnitudes of the motor driving torques Tmc), and maintaining the magnitudes of the friction braking forces Bf constant. In other words, in the state where the eABS control state transitions from the state B to the state A, the electronic control unit 26 increases only the magnitudes of the motor braking torques Tmr (or decreases only the magnitudes of the motor driving torques Tmc) to respond to the increase in the required braking forces F0 (ideal braking forces μW).

Then, for example, when the friction coefficient μ of the road surface recovers and increases to exceed the friction coefficient μ0, in Step S106, the electronic control unit 26 sets the value of the eABS control state flag State_eABS to "A" based on the determination in Steps S102 to S105 of the eABS control state flag calculation routine, thereby causing the eABS control state to transition from the state B to the state A. As illustrated in FIG. 14, as a result of the transition from the state B to the state A, the electronic control unit 26 provides, via the inverter 19, the respective in-wheel motors 15 to 18 with the regeneration control, thereby generating the motor braking torques Tmr. As a result, as illustrated in FIG. 14, when the eABS control state transitions to the state A, and, for example, the depressing operation amount of the brake pedal B by the driver is small (that is, the depressing force P is small), the electronic control unit 26 causes the respective in-wheel motors 15 to 18 to generate the motor braking torques Tmr by means of the regeneration control, thereby generating the required braking forces (ideal braking forces μW) while maintaining the friction braking forces Bf to approximately "0".

In this way, the electronic control unit 26 generates the ideal braking forces μW on the left and right front wheels 11 and 12 and the rear wheels 13 and 14, thereby imparting the required braking forces F0 determined in Step S14 to the vehicle Ve, proceeds to Step S25, once finishes the execution of the braking control program, and, after elapse of a predetermined short period, in Step S10, again starts the execution of the program.

As understood from the description above, when the eABS control state is caused to transition between the state A and the state B, more specifically, when it is necessary to cause the state to transition between the state A and the state B, the electronic control unit 26 can change the magnitudes of the motor braking torques Tmr or the motor driving torques Tmc generated by the respective in-wheel motors 15 to 18 to increase or decrease, and, simultaneously, can change the magnitudes of the friction braking forces Bf generated by the respective friction brake mechanisms 21 to 24 to increase or decrease. In other words, in the state where the eABS control state is caused to transition, the electronic control unit 26 can maintain the change directions of the magnitudes of the forces (or the acting directions of the respective forces) generated by the respective in-wheel motors 15 to 18 and the respective friction brake mechanisms 21 to 24 in the one direction.

As a result, according to the first embodiment, when the state is caused to transition between the state A and the state B in order to appropriately brake the vehicle Ve including the respective wheels 11 to 14 having a tendency to lock, the inverting state where the respective in-wheel motors 15 to 18 are repeatedly activated in the power running state and the regeneration state, that is, the motor braking torques Tmr and the motor driving torques Tmc are repeatedly generated does not occur, and the friction braking forces Bf by the respective friction brake mechanisms 21 to 24 activated in cooperation with the respective in-wheel motors 15 to 18 do not fluctuate. Thus, the driver does not feel the sense of discomfort caused by the fluctuation in the required braking forces F0 (ideal braking forces μW) generated on the wheels 11 to 14 for braking the vehicle Ve. Moreover, the acting directions of the motor braking torques Tmr or the motor driving torques Tmc generated by the respective in-wheel motors 15 to 18 can be maintained in one direction, thus, for example, even when a backlash is provided on a power transmission system (such as a speed reduction machine) to the wheels 11 to 14 of the respective in-wheel motors 15 to 18, a time lag in terms of control generated by reducing the backlash is not generated, and the noise caused by the backlash can be prevented from being generated. Thus, extremely excellent responsiveness can be secured, thereby quickly converging the state transition of the eABS control state, and generating appropriate braking forces (required braking forces F0) on the respective wheels 11 to 14.

a-1. Variation of First Embodiment

The first embodiment is realized in a manner that, in the state transition cooperative activation control routine illustrated in FIG. 11 executed in Step S23 of the braking control program, when the electronic control unit 26 determines that the required braking forces F0 have increased based on the determination processing in Step S201, the electronic control unit 26 increases only the magnitudes (distribution) of the friction braking forces Bf by the respective friction brake mechanisms 21 to 24 in response to the increases in the required braking forces F0 in Step S202, and when the electronic control unit 26 determines that the required braking forces F0 have decreased based on the determination processing in Step S203, the electronic control unit 26 decreases only the magnitudes (distribution) of the motor braking torques Tmr by the respective in-wheel motors 15 to 18 in response to the decreases of the required braking forces F0 in Step S204.

Moreover, in the state transition cooperative activation control routine illustrated in FIG. 12 executed in Step S23 of the braking control program, when the electronic control unit 26 determines that the required braking forces F0 have decreased based on the determination processing in Step S201', the electronic control unit 26 decreases only the magnitudes (distribution) of the friction braking forces Bf by the respective friction brake mechanisms 21 to 24 in response to the decreases in the required braking forces F0 in Step S202', and when the electronic control unit 26 determines that the required braking forces F0 have increased based on the determination processing in Step S203', the electronic control unit 26 increases only the magnitudes (distribution) of the motor braking torques Tmr by the respective in-wheel motors 15 to 18 in response to the increases of the required braking forces F0 in Step S204'.

In this case, for example, depending on the magnitudes of the change amounts for adjusting the increases/decreases of the required braking forces F0, that is, the increase/decrease requests for the braking forces, the magnitudes of the friction braking forces Bf by the respective friction brake mechanisms 21 to 24 can be increased/decreased, or the magnitudes of the motor braking torques Tmr by means of the regeneration control for the respective in-wheel motors 15 to 18 can be increased/decreased.

A detailed description is now given of a variation of the first embodiment, and like components (particularly the state transition cooperative activation control routine) are denoted by like numerals as of the first embodiment, and a detailed description thereof is omitted. On this occasion, in the following, for facilitating understanding, the case where the eABS control state transitions from the state A to the state B (the case corresponding to the state transition cooperative activation control routine illustrated in FIG. 11 described in the first embodiment) is exemplified for description. Note that, it is needless to say that the case where the eABS control state transitions from the state B to the state A (the case corresponding to the state transition cooperative activation control routine illustrated in FIG. 12 described in the first embodiment) can be similarly embodied.

Figure 15:
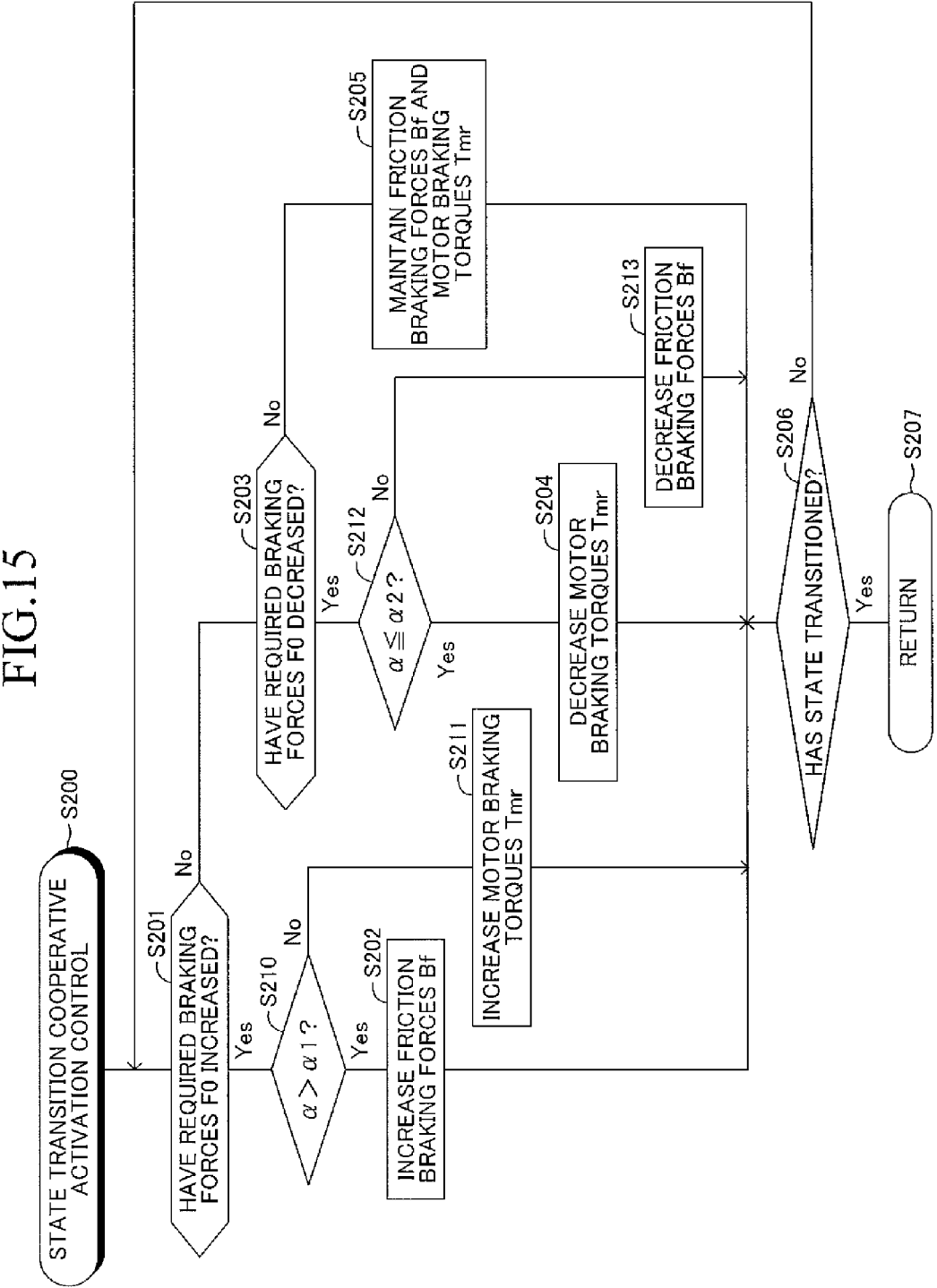
FIG. 15 is a flowchart illustrating the state transition cooperative activation control routine when the state transitions from the state A to the state B in the braking control program in FIG. 2 according to a variation of the first embodiment of the present invention.

The state transition cooperative activation control routine is executed in Step S23 of the braking control program also in this variation as in the first embodiment. However, the state transition cooperative activation control routine in this variation is slightly different only in such a point that Steps S210 to S213 are added as illustrated in FIG. 15 as compared with the cooperative activation control routine according to the first embodiment illustrated in FIG. 11. Thus, in the following, a description is mainly given of Steps S210 to S213, which are added.

As illustrated in FIG. 15, also in this variation, in Step S200, the electronic control unit 26 starts the execution of the cooperative activation control routine, and, in Step S201, which follows, determines whether or not the required braking forces F0 have increased. Then, when the increase in the required braking forces F0 is required, the electronic control unit 26 makes a determination of "Yes", and proceeds to Step S210. On the other hand, when the increase in the required braking forces F0 is not required, the electronic control unit 26 proceeds to Step S203 as in the first embodiment.

In Step S210, the electronic control unit 26 compares the increase in the required braking forces F0, that is, a magnitude of a change amount $\alpha$ for adjusting the increase request for the braking forces for braking the vehicle Ve and a magnitude of a predetermined change amount $\alpha 1$ set in advance with each other, and determines whether or not the magnitude of the change amount $\alpha$ is larger than the magnitude of the change amount $\alpha 1$ On this occasion, the magnitude of the change amount $\alpha$, for example, can be calculated by calculating a difference between the magnitudes of the required braking forces F0(n−1) calculated in Step S14 of the braking force control program of last time and the magnitudes of the required braking forces F0(n) calculated in Step S14 of the braking force control program of this time with each other. Moreover, the magnitude of the predetermined change amount $\alpha 1$ set in advance is set in advance to a value smaller than the magnitudes of the motor braking torques Tmr which can be generated when the regeneration control is applied to the respective in-wheel motors 15 to 18.

Then, when the magnitude of the change amount $\alpha$ is larger than the magnitude of the predetermined change amount $\alpha 1$, the electronic control unit 26 makes a determination of "Yes", and proceeds to Step S202. In other words, in this case, the change amount $\alpha$, which is the increase in the required braking forces F0, is large, and, in order to appropriately increase the required braking forces F0, the electronic control unit 26 thus increases only the magnitudes of the friction braking forces Bf by the respective friction brake mechanisms 21 to 24 in Step S202, thereby generating the increased required braking forces F0, that is, the ideal braking forces μW. On the other hand, when the magnitude of the change amount $\alpha$ is equal to or less than the magnitude of the predetermined change amount $\alpha 1$, the electronic control unit 26 makes a determination of "No", and proceeds to Step S211.

In Step S211, the electronic control unit 26 increases only the magnitudes of the motor braking torques Tmr generated by the respective in-wheel motors 15 to 18 by an amount corresponding to the change amount $\alpha$ in response to the increase (that is, the change amount $\alpha$) in the required braking forces F0, which is equal to or less than the predetermined change amount $\alpha 1$, and generates the increased required braking forces F0, that is, the ideal braking forces μW. In other words, in this variation, even when the eABS control state transitions from the state A to the state B, when the required braking forces F0 increase, the electronic control unit 26 provides the in-wheel motors 15 to 18 with the regeneration control, thereby increasing the magnitudes of the motor braking torques Tmc by the amount corresponding to the change amount $\alpha$ to respond to the increase while maintaining the magnitudes of the friction braking forces Bf by the respective friction brake mechanisms 21 to 24. As a result, when the required braking force F0 increases by the amount equal to or less than the change amount $\alpha 1$, the magnitudes of the friction braking forces Bf by the respective friction brake mechanisms 21 to 24 do not change, and the magnitudes of the motor braking torques Tmr by the respective in-wheel motors 15 to 18 change only in the increasing direction.

Then, the electronic control unit 26 causes, via the brake actuator 25, the respective friction brake mechanisms 21 to 24 to generate the friction braking forces Bf having approximately constant magnitudes in response to the increase request for the required braking forces F0 (ideal braking forces μW), and provides, via the inverter 19, the respective in-wheel motors 15 to 18 with the regeneration control, thereby increasing the magnitudes of the motor braking torques Tmr in response to the magnitude of the change amount $\alpha$. As a result, the ideal braking forces μW are generated on the left and right front wheels 11 and 12 and the left and right rear wheels 13 and 14, thereby imparting the increased required braking forces F0 to the vehicle Ve.

Moreover, in Step S203, the electronic control unit 26 determines whether or not the required braking forces F0 have decreased. Then, when the decrease in the required braking forces F0 is required, the electronic control unit 26 makes a determination of "Yes", and proceeds to Step S212. On the other hand, when the decrease in the required braking forces F0 is not required, the electronic control unit 26 proceeds to Step S205 as in the first embodiment.

In Step S212, the electronic control unit 26 compares the decrease in the required braking forces F0, that is, a magnitude of a change amount $\alpha$ for adjusting the decrease request for the braking forces for braking the vehicle Ve and a magnitude of a predetermined change amount $\alpha 2$ set in advance with each other, and determines whether or not the magnitude of the change amount α is larger than the magnitude of the change amount α2. On this occasion, as described above, the magnitude of the change amount α can be calculated by calculating a difference between the magnitudes of the required braking forces F0(n−1) calculated in Step S14 of the braking force control program of last time and the magnitudes of the required braking forces F0(n) calculated in Step S14 of the braking force control program of this time with each other. Moreover, the magnitude of the predetermined threshold value α2 set in advance is set in advance to a value smaller than the magnitudes of the motor driving torques Tmc (for example, creep torques) which can be generated when the power running control is applied to the respective in-wheel motors 15 to 18.

Then, when the magnitude of the change amount α is equal to or smaller than the magnitude of the predetermined change amount α2, the electronic control unit 26 makes a determination of "Yes", and proceeds to Step S204. In other words, in this case, the change amount α, which is the decrease in the required braking forces F0, is small, and hence, in order to quickly decrease the required braking forces F0, only the motor braking torques Tmr currently generated by the respective in-wheel motors 15 to 18 by means of the regeneration control are decreased, in other words, the motor driving torques Tmc are successively increased by means of the power running control, thereby generating the decreased required braking forces F0, that is, the ideal braking forces μW. On the other hand, when the magnitude of the change amount α is larger than the magnitude of the predetermined change amount α2, the electronic control unit 26 makes a determination of "No", and proceeds to Step S213.

In Step S213, the electronic control unit 26 brings the respective friction brake mechanisms 21 to 24 into the non-braking state, and decreases only the magnitudes of the friction braking forces Bf by the amount corresponding to the change amount α in order to respond to the decrease (that is, the change amount α) in the required braking forces F0, which is larger than the magnitude of the predetermined change amount α2, thereby generating the required braking forces F0, that is, the ideal braking forces μW. In other words, in this case, the motor braking torques Tmr currently generated by the respective in-wheel motors 15 to 18 by means of the regeneration control are maintained, and only the magnitudes of the friction braking forces Bf are decreased.

Then, the electronic control unit 26 brings, via the brake actuator 25, the respective friction brake mechanisms 21 to 24 into the non-braking state in order to respond to such the decrease request for the required braking forces F0 (ideal braking forces μW) as to greatly decrease the predetermined change amount α2, and maintains, via the inverter 19, the motor braking torques Tmr by the respective in-wheel motors 15 to 18. As a result, the ideal braking forces μW are generated on the left and right front wheels 11 and 12 and the left and right rear wheels 13 and 14, thereby imparting the required braking forces F0 to the vehicle Ve.

In this way, the same effects as those of the first embodiment can be provided in the variation. Then, in the variation, only any one of the magnitudes of the friction braking forces Bf and the magnitudes of the motor braking torques Tmr can be increased/decreased accordingly depending on the magnitude of the change amount α in the required braking forces F0, and, thus, such effects as an increase in robustness of the control can be provided. Particularly, for a request to increase/decrease the required braking forces F0 by a relatively small amount, the electronic control unit 26 provides the respective in-wheel motors 15 to 18 with the regeneration control, thereby increasing/decreasing only the motor braking torques Tmr accordingly. Therefore, the increase/decrease request for the required braking forces F0 can be responded in an extremely high responsive manner.

b. Second Embodiment

The first embodiment is realized in a manner that the magnitudes of the required braking forces F0 (ideal braking forces μW) are determined by executing the braking control program, and the magnitudes (distribution) of the friction braking forces Bf and the magnitudes (distribution) of the motor braking torques Tmr or the motor driving torques Tmc are determined depending on the eABS control state (state A or state B) in order to impart the determined required braking forces F0 (ideal braking forces μW) to the vehicle Ve. In this case, appropriate determination of the magnitudes of the required braking forces F0 (ideal braking forces μW) may become difficult depending on the traveling state (traveling environment) of the vehicle Ve and the like. Thus, according to a second embodiment of the present invention, the electronic control unit 26 executes the state transition cooperative activation control routine illustrated in FIG. 16, thereby appropriately carrying out the eABS control depending on the friction coefficient μ of the road surface whether or not the required braking forces F0 (ideal braking forces μW) are determined. A detailed description is now given of the second embodiment. Like components (particularly the respective pieces of step processing of the braking control program) are denoted by like numerals as of the first embodiment to omit a description thereof, and a detailed description is given of the state transition cooperative activation control routine.

Figure 16:
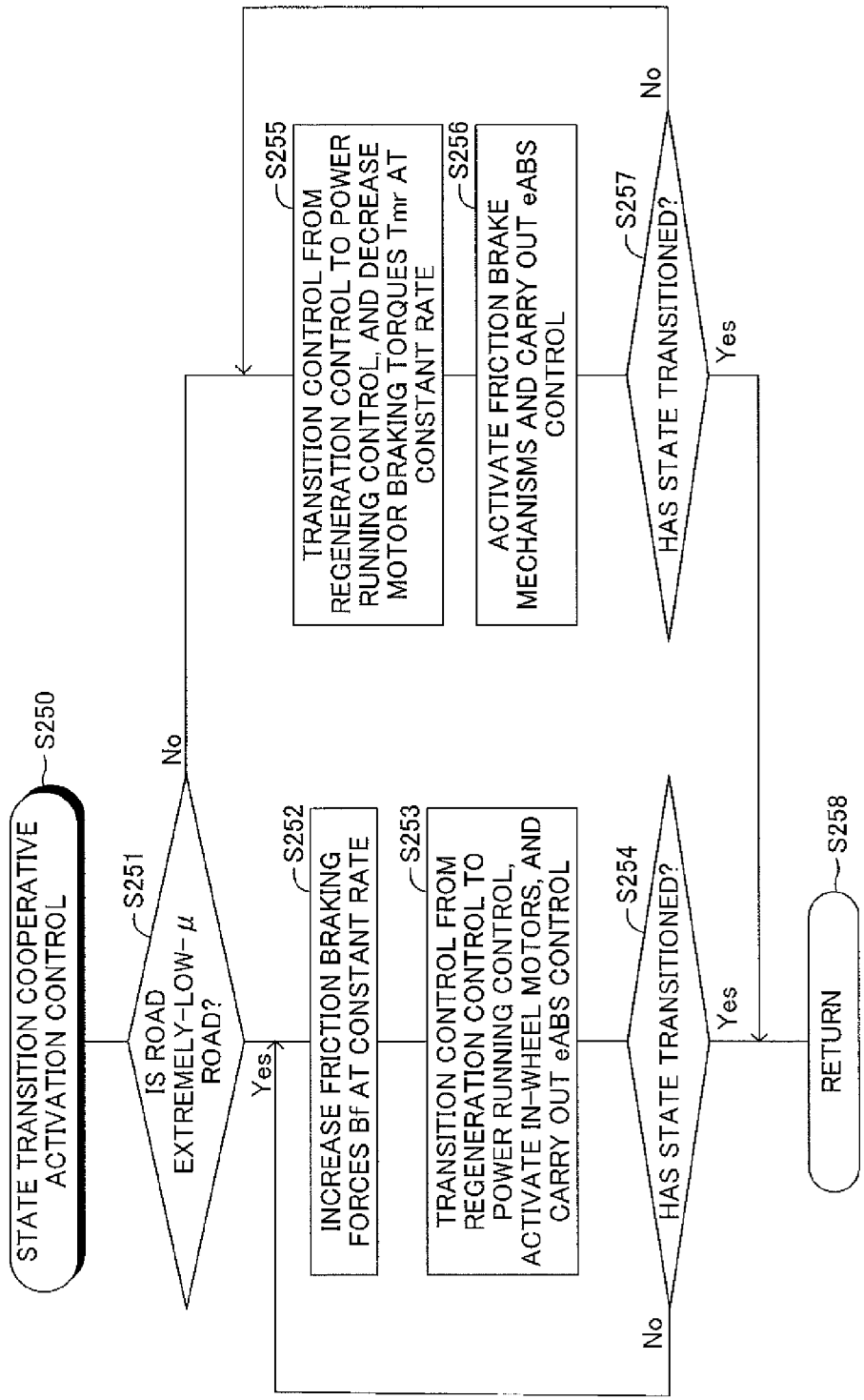
FIG. 16 is a flowchart illustrating the state transition cooperative activation control routine when the state transitions from the state A to the state B in the braking control program in FIG. 2 according to a second embodiment of the present invention.

According to the second embodiment, in Step S23 of the braking control program, the electronic control unit 26 executes the state transition cooperative activation control program illustrated in FIG. 16. In other words, in Step S250, the electronic control unit 26 starts the execution of the state transition cooperative activation control routine in the second embodiment. As the description of the state transition cooperative activation control routine according to the second embodiment, the case where the eABS control state transitions from the state A to the state B is exemplified and described, but it is needless to say that the case where the eABS control state transitions from the state B to the state A is the same.

In Step S251, which follows, the electronic control unit 26 determines whether or not the road surface is that of an extremely-low-μ road by using, for example, the friction coefficient μ of the road surface and the slip ratio S calculated in Step S13 of the braking control program described above. In other words, when the friction coefficient μ of the road surface is smaller than the predetermined friction coefficient μ0, or when the slip ratio S is larger than the predetermined slip ratio Ss, the road surface is that of an extremely-low-μ road. Therefore, the electronic control unit 26 makes a determination of "Yes", and proceeds to Step S252. On the other hand, when the road surface is not that of an extremely-low-μ road, the electronic control unit 26 makes a determination of "No", and proceeds to Step S255.

In Step S252, because the eABS control state is currently in the state A, for example, when the depressing operation is applied to the brake pedal B by the driver, the electronic control unit 26 increases the magnitudes of the friction braking forces Bf by the respective friction brake mechanisms 21 to 24 at a constant rate. Then, after the electronic control unit 26 increases the magnitudes of the friction braking forces Bf, the electronic control unit 26 proceeds to Step S253.

In Step S253, the electronic control unit 26 determines the start of the eABS control based on the increase in the friction braking forces Bf as described above, and then changes, via the inverter 19, the control for the respective in-wheel motors 15 to 18 from the regeneration control to the power running control in order to cause the eABS control state to quickly transition from the state A to the state B for the extremely-low-μ road. In other words, the electronic control unit 26 successively changes the motor torques generated by the respective in-wheel motors 15 to 18 from the motor braking torques Tmr by means of the regeneration control to the motor driving torques Tmc by means of the power running control. Then, when the respective in-wheel motors 15 to 18 start the change from the state where the respective in-wheel motors 15 to 18 generate the motor braking torques Tmr by means of the regeneration control to the state where the respective in-wheel motors 15 to 18 generate the motor driving torques Tmc by means of the power running control, the electronic control unit 26 proceeds to Step S254. In this case, the electronic control unit 26 periodically changes, via the inverter 19, the magnitudes of the motor braking torques Tmr (motor braking torques Tmc) by the respective in-wheel motors 15 to 18 during the transition of the eABS control state along with the start of the eABS control, thereby preventing the lock state from occurring on the wheels. As a result, also after the eABS control state has transitioned, the electronic control unit 26 periodically changes the magnitudes of the motor driving torques Tmc generated by the respective in-wheel motors 15 to 18 by means of the power running control, thereby continuously preventing the lock state from occurring on the wheels.

In Step S254, the electronic control unit 26 determines whether or not the eABS control state has transitioned from the state A to the state B. In other words, when the eABS control state has transitioned from the state A to the state B, for example, as a result of the execution of the eABS control state flag calculation routine, the electronic control unit 26 makes a determination of "Yes", and proceeds to Step S258. On the other hand, when the eABS control state has not transitioned from the state A to the state B yet, the electronic control unit 26 makes a determination of "No". Then, the electronic control unit 26 repeats the respective pieces of the step processing in and after Step S252 until the eABS control state transitions from the state A to the state B, that is, the determination of "Yes" is made in Step S254.

In this way, when, in Step S254, the electronic control unit 26 determines that the eABS control state has transitioned from the state A to the state B, the electronic control unit 26 proceeds to Step S258, and finishes the execution of the state transition cooperative activation control routine. Then, the electronic control unit 26 again returns to Step S23 of the braking control program as in the first embodiment.

Based on the determination of "No" in Step S251, the friction coefficient μ of the road surface is relatively high, and, in Step S255, the electronic control unit 26 thus decreases the motor braking torques Tmr generated by the respective in-wheel motors 15 to 18 by means of the regeneration control at a constant ratio. Then, in this case, the electronic control unit 26 changes the control for the respective in-wheel motors 15 to 18 from the regeneration control to the power running control in response to the transition of the eABS control state from the state A to the state B. In other words, the electronic control unit 26 successively changes the motor torques generated by the respective in-wheel motors 15 to 18 from the motor braking torques Tmr by means of the regeneration control to the motor driving torques Tmc by means of the power running control. Then, when the respective in-wheel motors 15 to 18 start the change from the state where the respective in-wheel motors 15 to 18 generate the motor braking torques Tmr by means of the regeneration control to the state where the respective in-wheel motors 15 to 18 generate the motor driving torques Tmc by means of the power running control, the electronic control unit 26 proceeds to Step S256.

In Step S256, the electronic control unit 26 increases the magnitudes of the friction braking forces Bf generated by the respective friction brake mechanisms 21 to 24, for example, in response to the depressing operation on the brake pedal B by the driver. Then, the electronic control unit 26 determines the start of the eABS control as described above depending on the magnitudes of the friction braking forces Bf, starts the eABS control, and proceeds to Step S257. In this case, the electronic control unit 26 periodically changes, via the brake actuator 25, the magnitudes of the friction braking forces Bf by the respective friction brake mechanisms 21 to 24 during the transition of the eABS control state along with the start of the eABS control, thereby preventing the lock state from occurring on the wheels. Note that, also in this case, the electronic control unit 26 periodically changes, via the inverter 19, the magnitudes of the motor braking torques Tmr (motor braking torques Tmc) by the respective in-wheel motors 15 to 18 along with the start of the eABS control, thereby preventing the lock state from occurring on the wheels. As a result, also after the eABS control state has transitioned, the electronic control unit 26 periodically changes the magnitudes of the motor driving torques Tmc generated by the respective in-wheel motors 15 to 18 by means of the power running control, thereby continuously preventing the lock state from occurring on the wheels.

In Step S257, the electronic control unit 26 determines whether or not the eABS control state has transitioned from the state A to the state B. In other words, when the eABS control state has transitioned from the state A to the state B, for example, as a result of the execution of the eABS control state flag calculation routine, the electronic control unit 26 makes a determination of "Yes", and proceeds to Step S258. On the other hand, when the eABS control state has not transitioned from the state A to the state B yet, the electronic control unit 26 makes a determination of "No". Then, the electronic control unit 26 repeats the respective pieces of the step processing in and after Step S255 until the eABS control state transitions from the state A to the state B, that is, the determination of "Yes" is made in Step S257.

In this way, when, in Step S257, the electronic control unit 26 determines that the eABS control state has transitioned from the state A to the state B, the electronic control unit 26 proceeds to Step S258, and finishes the execution of the cooperative activation control routine. Then, the electronic control unit 26 again returns to Step S23 of the braking control program as in the first embodiment.

As understood from the above-mentioned description, according to the second embodiment, as in the first embodiment, even when the required braking forces F0 required on the wheels 11 to 14 to brake the vehicle Ve cannot be appropriately determined, the tendency of the lock of the wheels 11 to 14 can surely be avoided while the eABS control state is appropriately transitioned depending on the road surface state. Moreover, even in this case, the inverting state where the motor braking torques Tmr and the motor driving torques Tmc are repeatedly generated by the respective in-wheel motors 15 to 18 is not generated while the eABS control state is being transitioned, and the friction braking forces Bf by the friction brake mechanisms 21 to 24 activated in cooperation with the respective in-wheel motors 15 to 18 do not fluctuate. Thus, when the tendency of the lock of the wheels 11 to 14 is surely avoided, thereby appropriately braking the vehicle Ve, the driver does not feel the sense of discomfort.

According to the second embodiment, when the eABS control state is caused to transition from the state B to the state A, in accordance with the state A after the state transitions, it is preferred that the electronic control unit 26 periodically cause, via the brake actuator 25, the magnitudes of the friction braking forces Bf by the respective friction brake mechanisms 21 to 24 to change along with the start of the eABS control, thereby preventing the lock state from occurring on the wheels. As a result, even after the transition of the eABS control state, the electronic control unit 26 can periodically cause the magnitudes of the friction braking forces Bf to change, thereby continuously preventing the lock state from occurring on the wheels.

c. Third Embodiment

The first embodiment, the variation thereof, and the second embodiment are realized in a manner that the electronic control unit 26 executes the eABS control state flag calculation routine to cause the eABS control state to transition from the state A to the state B, for example, when the friction coefficient μ of the road surface decreases below the predetermined road surface friction coefficient μ0 on an extremely-low-μ road. In other words, the first and second embodiments are realized in a manner that the eABS control state is caused to transition depending on an environment (more specifically, the road surface state and the like) in which the vehicle Ve is traveling.

By the way, as described in the first embodiment, the variation thereof, and the second embodiment, the driver is effectively prevented from feeling the sense of discomfort and sensing the noise caused by the transition of the eABS control state by maintaining, in one direction, the change direction of the motor torques by the in-wheel motors 15 to 18, and the change direction of the friction braking forces Bf by the friction brake mechanisms 21 to 24 when the eABS control state is caused to transition. However, it is desired that, even when the in-wheel motors 15 to 18 and the friction brake mechanisms 21 to 24 are activated in cooperation with each other, particularly the sense of discomfort be felt more rarely by the driver.

Thus, according to a third embodiment of the present invention, in combination with the first embodiment, the variation thereof, and the second embodiment, the electronic control unit 26 causes the eABS control state to transition in response to a state where the driver actively changes the motion state of the vehicle, specifically in a state where at least one of an operation by the driver to brake the traveling vehicle Ve (hereinafter referred to as brake operation), an operation by the driver to accelerate the vehicle Ve (hereinafter referred to as accelerator operation), and an operation by the driver to turn the vehicle Ve (hereinafter referred to as steering operation) is carried out. As a result, the active operation is carried out by the driver, and thus, the sense of discomfort caused by the transition of the eABS control state becomes inconspicuous in the state change of the vehicle Ve caused by the operation, and the sense of discomfort felt by the driver can effectively be made more hard to be felt. A detailed description is now given of the third embodiment, and like components (particularly the braking control program, the eABS control state flag calculation routine, and the state transition cooperative activation control routine) are denoted by like numerals as of the first embodiment, the variation thereof, and the second embodiment to omit a description thereof.

According to the third embodiment, the electronic control unit 26 executes the eABS control state flag calculation routine described above to determine, when it is necessary to cause the eABS control state to transition, and the state transition cooperative activation control routine described above in Step S23 of the braking control program is executed, whether or not the respective above-mentioned active operations are carried out by the driver, and provides such control as to cause the activations of the respective in-wheel motors 15 to 18 and the respective friction brake mechanisms 21 to 24 at a time point of transition of the eABS control state to cooperate with each other depending on the determined operation. In the following, for promoting the understanding, a description is given of the case where the eABS control state is caused to transition from the state A to the state B as an example, but it is needless to say that the same holds true for the case where the eABS control state is caused to transition from the state B to the state A.

Figure 17:
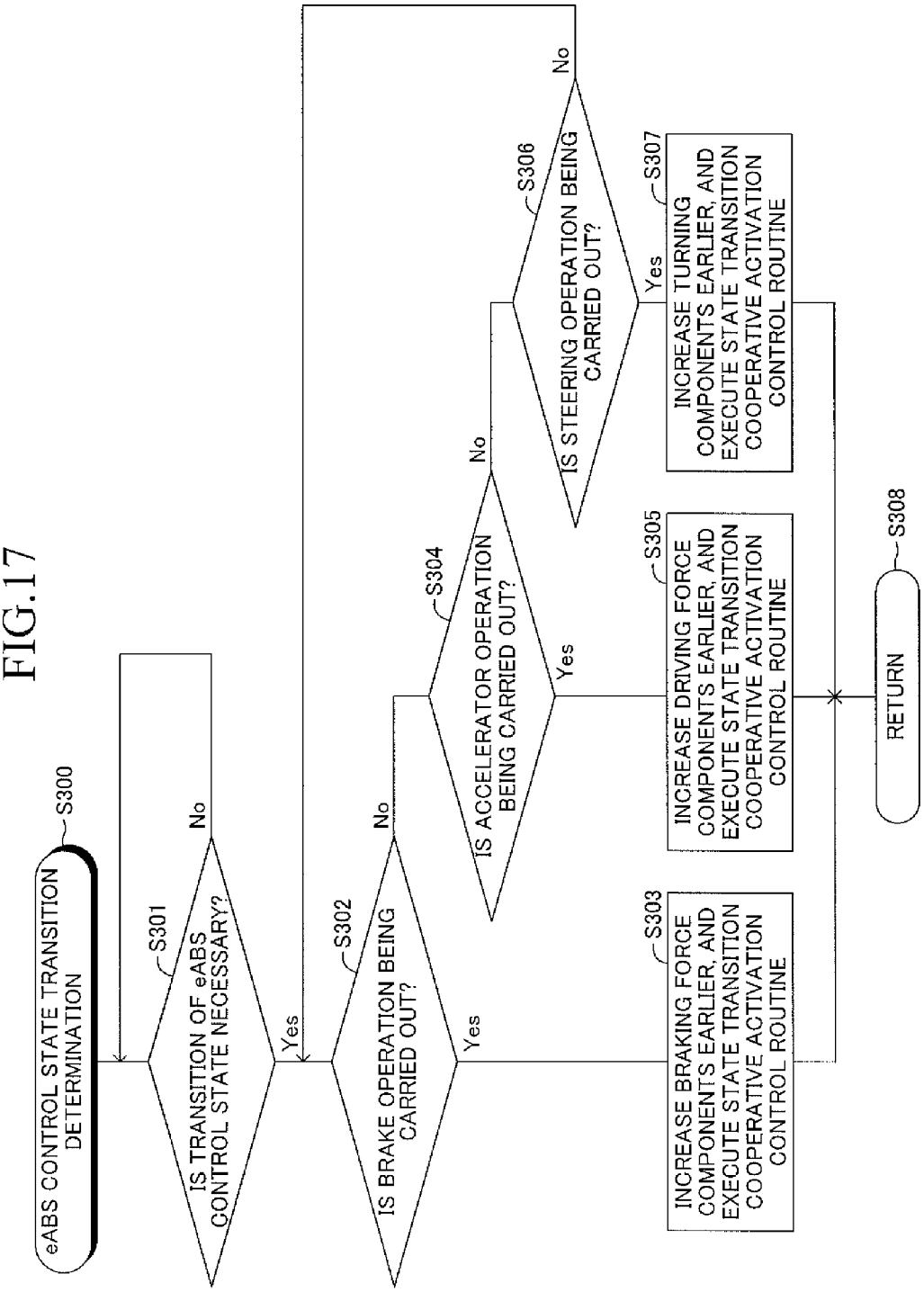
FIG. 17 is a flowchart illustrating an eABS control state transition determination routine in the braking control program in FIG. 2 according to a third embodiment of the present invention.

According to the third embodiment, the electronic control unit 26 executes an eABS control state transition determination routine illustrated in FIG. 17 simultaneously with the execution of the state transition cooperative activation control routine described above in Step S23 of the braking control program. A detailed description is now given of the eABS control state transition determination routine.

The electronic control unit 26 starts, in Step S300, the eABS control state transition determination routine illustrated in FIG. 17, and, in Step S301, which follows, determines whether or not the transition of the eABS control state is necessary. In other words, when the electronic control unit 26 determines that the eABS control state needs to transition, for example, from the state A to the state B as a result of the execution of the eABS control state flag calculation routine described above, the electronic control unit 26 makes a determination of "Yes", and proceeds to Step S302. On the other hand, when the electronic control unit 26 determines that it is not necessary to cause the eABS control state to transition, the electronic control unit 26 continues a determination of "No" until the eABS control state needs to transition, for example, from the state A to the state B as a result of the execution of the eABS control state flag calculation routine described above.

In Step S302, the electronic control unit 26 determines whether or not the driver is currently carrying out the brake operation. In other words, when the driver is applying the depressing operation on the brake pedal B, and thus is carrying out the brake operation, the electronic control unit 26 makes a determination of "Yes", and proceeds to Step S303. On the other hand, when the driver is not carrying out the brake operation, the electronic control unit 26 makes a determination of "No", and proceeds to Step S304.

In Step S303, the driver is currently carrying out the brake operation, and, thus, the electronic control unit 26 changes, earlier in time (that is, by priority), the magnitudes (distribution) of the braking force components in the required braking forces F0 (ideal braking forces μW) simultaneously with the brake operation, thereby executing the cooperative activation control routine described above in response to the transition of the eABS control state. Specifically, as described above, the state A of the eABS control state is a state where the respective in-wheel motors 15 to 18 generate the motor braking torques Tmr by means of the regeneration control, and the respective friction brake mechanisms 21 to 24 generate the friction braking forces Bf, thereby realizing the ideal braking forces μW, and imparting the required braking forces F0 to the vehicle Ve. On the other hand, the state B of the eABS control state is a state where the respective in-wheel motors 15 to 18 generate the motor driving torques Tmc by means of the power running control, and the respective friction brake mechanisms 21 to 24 generate the friction braking forces Bf, thereby realizing the ideal braking forces μW, and imparting the required braking forces F0 to the vehicle Ve.

Therefore, when the eABS control state is caused to transition from the state A to the state B, the respective in-wheel motors 15 to 18 transition from the state for generating the motor braking torques Tmr (that is, the braking force components) by means of the regeneration control to the state for generating the motor driving torques Tmc (that is, the driving force components) by means of the power running control. On the other hand, even when (before and after) the eABS control state is caused to transition from the state A to the state B, the friction brake mechanisms 21 to 24 generate the friction braking forces Bf (that is, the braking force components).

On this occasion, while the driver is carrying out the brake operation, the driver intends to brake the vehicle Ve. Therefore, when the braking force components generated by the respective friction brake mechanisms 21 to 24 are changed earlier in time than (by priority to) the generation of the driving force components by the respective in-wheel motors 15 to 18 in response to the intention of the driver, the changes of the braking force components become inconspicuous in the brake operation by the driver, and the driver more rarely feels the sense of discomfort caused by the transition of the eABS control state.

Figure 18:
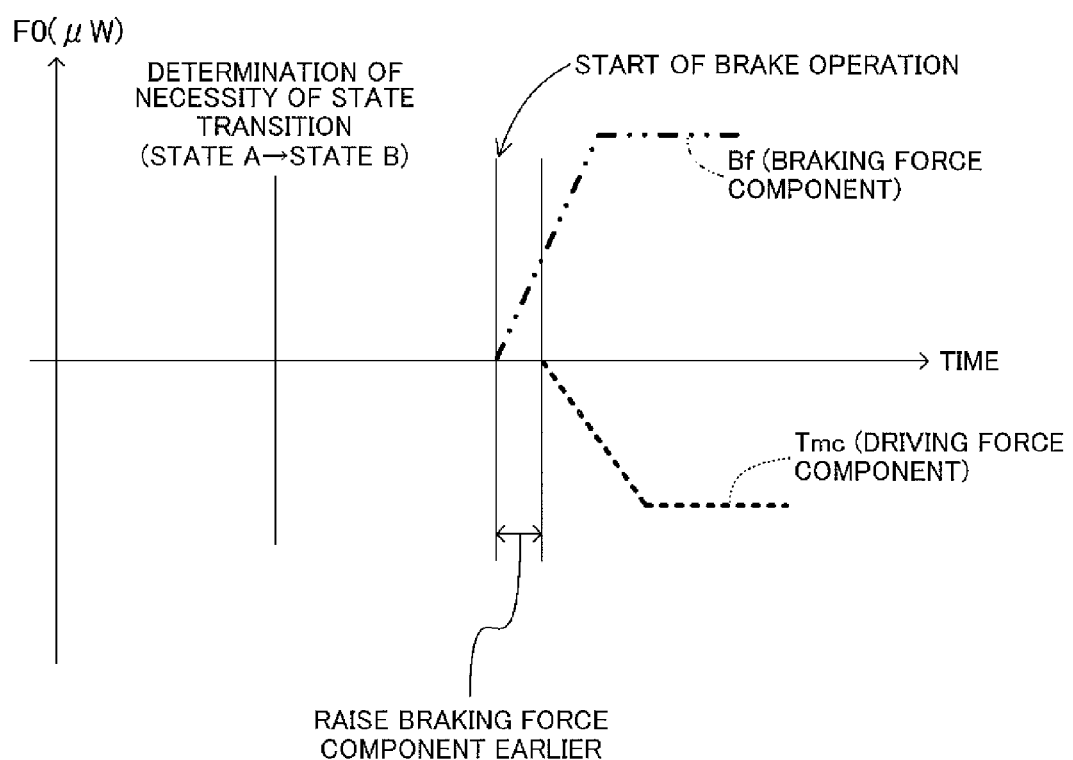
FIG. 18 is a chart illustrating generation of braking force components earlier in time than driving force components in response to a brake operation by a driver.

Thus, in Step S303, in a case where the electronic control unit 26 executes the cooperative activation control routine described above, when it is necessary to cause the eABS control state to transition from the state A to the state B, and the driver carries out the brake operation, as illustrated in FIG. 18, the electronic control unit 26 determines to change (in FIG. 18, increase) the magnitudes (distribution) of the braking force components (specifically, the friction braking forces Bf by the respective friction brake mechanisms 21 to 24) in the required braking forces F0 in the state B earlier in time (by priority), and then change (in FIG. 18, increase) the magnitudes (distribution) of the driving force components (specifically, the motor driving torques Tmc by means of the power running control applied to the respective in-wheel motors 15 to 18) in the required braking forces F0 in the state B.

Then, the electronic control unit 26 activates the respective friction brake mechanisms 21 to 24 earlier in time (by priority) by means of the regeneration control depending on the magnitudes (distribution) of the friction braking forces Bf and the magnitudes (distribution) of the motor driving torques Tmc determined in this way, and, then, controls the activations of the respective in-wheel motors 15 to 18. After the electronic control unit 26 activates the respective friction brake mechanisms 21 to 24 and the in-wheel motors 15 to 18 in accordance with the state transition cooperative activation control routine in this way, the electronic control unit 26 proceeds to Step S308, and finishes the execution of the eABS control state transition determination routine. After the execution of the state transition cooperative activation control routine is finished, the electronic control unit 26 again returns to Step S23 of the braking control program.

In Step S304, the electronic control unit 26 determines whether or not the driver is currently carrying out the accelerator operation. In other words, when the driver is applying the depressing operation on an accelerator pedal (not shown), and thus is carrying out the accelerator operation, the electronic control unit 26 makes a determination of "Yes", and proceeds to Step S305. On the other hand, when the driver is not carrying out the accelerator operation, the electronic control unit 26 makes a determination of "No", and proceeds to Step S306.

In Step S305, the driver is currently carrying out the accelerator operation, and, thus, the electronic control unit 26 changes, earlier in time (that is, by priority), the magnitudes (distribution) of the driving force components in the required braking forces F0 (ideal braking forces μW) simultaneously with the accelerator operation, thereby executing the state transition cooperative activation control routine described above in response to the transition of the eABS control state. Specifically, as described above, when the eABS control state is caused to transition from the state A to the state B, the respective in-wheel motors 15 to 18 transition from the state for generating the motor braking torques Tmr (that is, the braking force components) by means of the regeneration control to the state for generating the motor driving torques Tmc (that is, the driving force components) by means of the power running control. On the other hand, even when (before and after) the eABS control state is caused to transition from the state A to the state B, the friction brake mechanisms 21 to 24 generate the friction braking forces Bf (that is, the braking force components).

On this occasion, while the driver is carrying out the accelerator operation, the driver intends to accelerate the vehicle Ve. Therefore, when the driving force components generated by the respective in-wheel motors 15 to 18 are changed earlier in time than (by priority to) the generation of the braking force components by the respective friction brake mechanisms 21 to 24 in response to the intention of the driver, the changes of the driving force components become inconspicuous in the accelerator operation by the driver, and the driver more rarely feels the sense of discomfort caused by the transition of the eABS control state.

Figure 19:
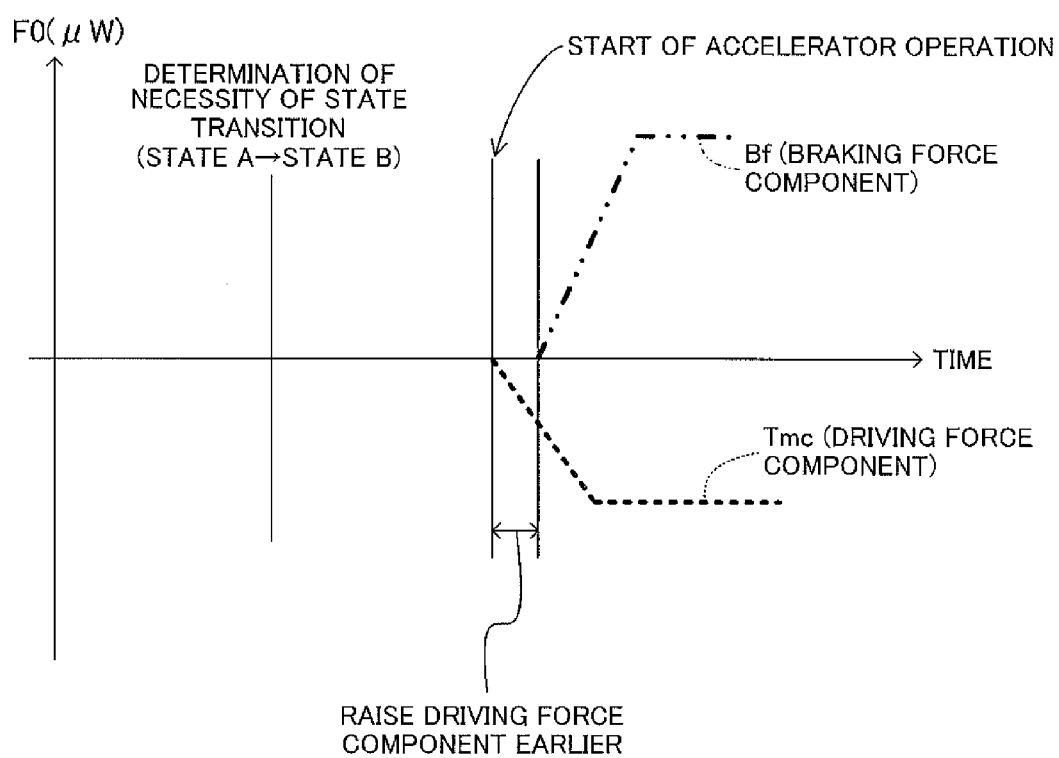
FIG. 19 is a chart illustrating generation of the driving force components earlier in time than the braking force components in response to an accelerator operation by the driver.

Thus, in Step S305, in a case where the electronic control unit 26 executes the state transition cooperative activation control routine described above, when it is necessary to cause the eABS control state to transition from the state A to the state B, and the driver carries out the accelerator operation, as illustrated in FIG. 19, the electronic control unit 26 determines to change (in FIG. 19, increase) the magnitudes (distribution) of the driving force components (specifically, the motor driving torques Tmc by the respective in-wheel motors 15 to 18) in the required braking forces F0 in the state B earlier in time (by priority), and then change (in FIG. 19, increase) the magnitudes (distribution) of the braking force components (specifically, the friction braking forces Bf by the respective friction brake mechanisms 21 to 24) in the required braking force F0 in the state B.

Then, the electronic control unit 26 activates the respective in-wheel motors 15 to 18 earlier in time (by priority) by means of the power running control depending on the magnitudes (distribution) of the motor driving torques Tmc and the magnitudes (distribution) of the friction braking forces Bf determined in this way, and, then, controls the activations of the respective friction brake mechanisms 21 to 24. After the electronic control unit 26 activates the respective in-wheel motors 15 to 18 and the friction brake mechanisms 21 to 24 in accordance with the state transition cooperative activation control routine in this way, the electronic control unit 26 proceeds to Step S308, and finishes the execution of the eABS control state transition determination routine. After the execution of the state transition cooperative activation control routine is finished, the electronic control unit 26 again returns to Step S23 of the braking control program.

In Step S306, the electronic control unit 26 determines whether or not the driver is currently carrying out the steering operation. In other words, when the driver is turning and operating a steering wheel (not shown), and thus is carrying out the steering operation, the electronic control unit 26 makes a determination of "Yes", and proceeds to Step S307. On the other hand, when the drive is not carrying out the steering operation, the electronic control unit 26 makes a determination of "No", and returns to Step S302 to execute the respective pieces of the step processing in and after Step S302.

In Step S307, the driver is currently carrying out the steering operation, and, thus, the electronic control unit 26 changes, earlier in time (that is, by priority), the magnitudes (distribution) of the braking force components or the magnitudes (distribution) of the driving force components in the required braking forces F0 (ideal braking forces μW) simultaneously with the steering operation, more specifically, an increase in turning mobility of the vehicle Ve, thereby executing the state transition cooperative activation control routine described above in response to the transition of the eABS control state. Specifically, as described above, when the eABS control state is caused to transition from the state A to the state B, the respective in-wheel motors 15 to 18 transition from the state for generating the motor braking torques Tmr (that is, the braking force components) by means of the regeneration control to the state for generating the motor driving torques Tmc (that is, the driving force components) by means of the power running control. On the other hand, even when (before and after) the eABS control state is caused to transition from the state A to the state B, the friction brake mechanisms 21 to 24 generate the friction braking forces Bf (that is, the braking force components).

On this occasion, while the driver is carrying out the steering operation, the driver intends to turn the vehicle Ve. In response to the intention of the driver, when braking forces are relatively imparted to the front and rear wheels positioned inside the turn of the vehicle (for example, when the vehicle Ve is turning left, the left front wheel 11 and the left rear wheel 13 illustrated in FIG. 1), and driving forces are relatively imparted to the front and rear wheels positioned outside the turn of the vehicle (for example, when the vehicle Ve is turning left, the right front wheel 12 and the right rear wheel 14 illustrated in FIG. 1), the turning mobility of the vehicle Ve can be increased.

Based on this fact, in response to the intention to turn the vehicle Ve by carrying out the steering operation by the driver, the braking force components generated by the friction brake mechanisms 21 and 23 or the friction brake mechanisms 22 and 24 positioned inside the turn are changed earlier in time than (by priority to) the generation of the driving force components by the in-wheel motors 15 and 17 or the in-wheel motors 16 and 18 positioned inside the turn, and the driving force components generated by the in-wheel motors 16 and 18 or the in-wheel motors 15 and 17 positioned outside the turn are changed earlier in time than (by priority to) the generation of the braking force components by the friction brake mechanisms 22 and 24 or the friction brake mechanisms 21 and 23 positioned outside the turn. Thus, the changes in the braking force components and the driving force components become inconspicuous in the steering operation by the driver, and the driver rarely feels the sense of discomfort caused by the transition of the eABS control state.

A specific description is now given of this situation, and, as illustrated in FIG. 18, in response to, for example, the intention of the driver to turn left the vehicle Ve, the magnitudes (distribution) of the braking force components (specifically the friction braking forces Bf by the friction brake mechanisms 21 and 23) in the required braking forces F0 in the state B are changed (increased) earlier in time (by priority) on the left front wheel 11 and the left rear wheel 13 positioned inside the turn of the vehicle Ve. On the other hand, as illustrated in FIG. 19, the magnitudes (distribution) of the driving force components (specifically the motor driving torques Tmc by the in-wheel motors 16 and 18) in the required braking forces F0 in the state B are changed (increased) earlier in time (by priority) on the right front wheel 12 and the right rear wheel 14 positioned outside the turn of the vehicle Ve. Note that, in the following description, the braking force components on the wheels inside the turn and the driving force components on the wheels outside the turn, which are changed while the driver is carrying out the steering operation, are also collectively referred to as "turn component". In this way, as a result of the change earlier in time than (by priority to) the turning components depending on the turn direction of the vehicle Ve, the changes in the braking force components and the driving force components thus become inconspicuous in the steering operation by the driver, and the driver can sense the appropriate turn mobility of the vehicle Ve while rarely feeling the sense of discomfort caused by the transition of the eABS control state.

Thus, in Step S307, when the electronic control unit 26 executes the state transition cooperative activation control routine described above, when it is necessary to cause the eABS control state to transition from the state A to the state B, and the driver carries out the steering operation, as illustrated in FIG. 18, the electronic control unit 26 determines to change (in FIG. 18, increase) the magnitudes (distribution) of the braking force components (specifically, the friction braking forces Bf by corresponding ones of the friction brake mechanisms 21 to 24) in the required braking forces F0 on the wheels inside the turn in the state B earlier in time (by priority), and then change (in FIG. 18, increase) the magnitudes (distribution) of the driving force components (specifically, the motor driving torques Tmc by corresponding ones of the in-wheel motors 15 to 18) in the required braking forces F0 on the wheels inside the turn in the state B.

Moreover, in Step S307, when the electronic control unit 26 executes the state transition cooperative activation control routine described above, when it is necessary to cause the eABS control state to transition from the state A to the state B, and the driver carries out the steering operation, as illustrated in FIG. 19, the electronic control unit 26 determines to change (in FIG. 19, increase) the magnitudes (distribution) of the driving force components (specifically, the motor driving torques Tmc by corresponding ones of the in-wheel motors 15 to 18) in the required braking forces F0 on the wheels outside the turn in the state B earlier in time (by priority), and then change (in FIG. 19, increase) the magnitudes (distribution) of the braking force components (specifically, the friction braking forces Bf by corresponding ones of the friction brake mechanisms 21 to 24) in the required braking forces F0 on the wheels outside the turn in the state B.

Then, the electronic control unit 26 controls the activation of the respective friction brake mechanisms 21 to 24 and the respective in-wheel motors 15 to 18 as described above depending on the magnitudes (distribution) of the friction braking forces Bf and the magnitudes (distribution) of the motor driving torques Tmc determined in this way. After the electronic control unit 26 activates the respective friction brake mechanisms 21 to 24 and the in-wheel motors 15 to 18 in accordance with the state transition cooperative activation control routine in this way, the electronic control unit 24 proceeds to Step S308, and finishes the execution of the eABS control state transition determination routine. After the execution of the state transition cooperative activation control routine is finished, the electronic control unit 26 again returns to Step S23 of the braking control program.

As understood from the description before, according to the third embodiment, the respective in-wheel motors 15 to 18 and the friction brake mechanisms 21 to 24 can be activated in cooperation with each other simultaneously with the brake operation, the accelerator operation, and the steering operation for changing the traveling state (or the motion state) of the vehicle Ve by the driver, thereby causing the eABS control state to transition. In other words, in this case, the eABS control state can be caused to transition while the state transition is inconspicuous in the state change of the vehicle intended by the operation of the driver. Thus, the tendency of the lock of the wheels 11 to 14 is surely avoided, thereby appropriately braking the vehicle Ve, and the driver thus more rarely feels the sense of discomfort when the eABS control state is caused to transition.

In carrying out the present invention, the present invention is not limited to each of the embodiments and variation, and various changes can be made without departing from an object of the present invention.

For example, in the respective embodiments and variation, when, in Step S19 of the braking control program, the eABS control state flag calculation routine is executed, all the pieces of the determination processing in Steps S103 to S105 of this routine is carried out. On this occasion, at least one piece of determination processing out of the pieces of the determination processing in Steps S103 to S105 may be carried out. Even when at least one piece of determination processing out of the pieces of the determination processing in Steps S103 to S105 is carried out, the value of the eABS control state flag State_eABS can be set to "A" or "B".

Moreover, in the respective embodiments and variation, the electronic control unit 26 uses the magnitude of the friction coefficient μ of the road surface, the magnitude of the slip ratio S, and the like to determine the value of the eABS control state flag State_eABS in the eABS control state flag calculation routine executed in Step S19 of the braking control program. In this case, the electronic control unit 26 can use, for example, current location information (road information) on the vehicle Ve detected by a navigation unit installed on the vehicle Ve and various pieces of information (such as external temperature information and weather information, obtained by communication with an external server or the like to set the eABS control state flag State_eABS to "A" or "B".

Moreover, in the respective embodiments and the variation, a detailed description is given of the case where the electronic control unit 26 causes the control state to transition during the eABS control. In this case, it is needless to say that, for example, whether or not the state is in the eABS control state, the electronic control unit 26 can control the magnitudes of the motor braking torques Tmr or the magnitudes of the motor driving torques Tmc by the respective in-wheel motors 15 to 18 and the magnitudes of the friction braking forces Bf by the respective friction brake mechanisms 21 to 24 for the transition from the state corresponding to the state A to the state corresponding to the state B or for the transition from the state corresponding to the state B to the state corresponding to the state A as in the embodiments and the variation. Even in this case, the same effects as in the respective embodiments and variation are expected by changing, in one direction, any one of the magnitudes of the motor braking torques Tmr or the magnitudes of the motor driving torques Tmc by the respective in-wheel motors 15 to 18 and the magnitudes of the friction braking forces Bf by the respective friction brake mechanisms 21 to 24.

Moreover, in the respective embodiments and variation, the depressing force P, which is the operation amount on the brake pedal B operated by the driver, is used to determine the required braking forces F0. In this case, it is needless to say that, for example, an automatic brake unit installed on the vehicle can determine the required braking forces F0, or braking forces required to stabilize a traveling behavior of the vehicle can be employed as the required braking forces F0. Even in this case, the electronic control unit 26 can control the activations of the in-wheel motors 15 to 18 and the friction brake mechanisms 21 to 24 depending on the state transition as in the respective embodiments and variation.

Moreover, in the respective embodiments and the variation, the in-wheel motors 15 to 18 are provided on the respective wheels 11 to 14 of the vehicle Ve. On this occasion, for example, the in-wheel motors 15 and 16 may be provided only on the left and right front wheels 11 and 12 of the vehicle Ve, or the in-wheel motors 17 and 18 may be provided only on the left and right rear wheels 13 and 14 of the vehicle Ve. In this way, for example, even when the in-wheel motors are provided only on the front wheel side or the rear wheel side, the same effects as in the respective embodiments and variation can be provided by providing the respective in-wheel motors with the regeneration control or the power running control to generate the motor braking torque and the motor driving torque.

Further, in the respective embodiments and the variation, the in-wheel motors 15 to 18 are provided on the respective wheels 11 to 14 of the vehicle Ve. On this occasion, when the wheels 11 and 14 can respectively generate the motor braking torques Tmr and the motor driving torques Tmc, for example, motors may be provided on a body side of the vehicle Ve. Even in this case, the same effects as in the respective embodiments and variation can be expected.

The invention claimed is:

1. A braking force control apparatus for a vehicle, comprising:
an electromotive force generation mechanism for generating, independently on a wheel of a vehicle, an electromagnetic driving force or an electromagnetic braking force;
a braking force generation mechanism for generating a mechanical braking force on the wheel rotated by at least the electromagnetic driving force generated by the electromotive force generation mechanism; and
braking control means for activating, when the wheel tends to be locked, the electromotive force generation mechanism in any one of a power running state and a regeneration state so as to generate the electromagnetic driving force or the electromagnetic braking force, and, simultaneously, controlling the braking force generation mechanism to generate the mechanical braking force, wherein:
the braking control means controls generation of a braking force on the wheel by controlling the electromotive force generation mechanism and the braking force generation mechanism such that:
in a first state where the electromotive force generation mechanism is activated in the regeneration state so as to generate the electromagnetic braking force having a predetermined magnitude, and, simultaneously, the braking force generation mechanism is controlled to generate the mechanical braking force having a predetermined magnitude, thereby activating the electromotive force generation mechanism and the braking force generation mechanism in cooperation with each other;
in a second state where the electromotive force generation mechanism is activated in the power running state so as to generate the electromagnetic driving force having a predetermined magnitude, and, simultaneously, the braking force generation mechanism is controlled to generate the mechanical braking force having a predetermined magnitude, thereby activating the electromotive force generation mechanism and the braking force generation mechanism in cooperation with each other; and when a state is caused to transition from one of the first state and the second state to another of the first state and the second state, a magnitude of the electromagnetic braking force or a magnitude of the electromagnetic driving force generated by the electromotive force generation mechanism is either increased or decreased, and a magnitude of the mechanical braking force generated by the braking force generation mechanism is either increased or decreased.

2. The braking force control apparatus for a vehicle according to claim 1, wherein the braking control means is configured to:

determine a required braking force required for the wheel for braking the vehicle; and in a case where the state is caused to transition, when a magnitude of the determined required braking force increases or decreases, either increase or decrease any one of the magnitude of the electromagnetic driving force generated by the electromotive force generation mechanism, the magnitude of the electromagnetic braking force generated by the electromotive force generation mechanism, and the magnitude of the mechanical braking force generated by the braking force generation mechanism.

3. The braking force control apparatus for a vehicle according to claim 2, wherein the braking control means is configured to:

in a case where the state is caused to transition from the first state to the second state, when the magnitude of the required braking force increases, increase the magnitude of the mechanical braking force generated by the braking force generation mechanism while maintaining the magnitude of the electromagnetic braking force generated by the electromotive force generation mechanism, and when the magnitude of the required braking force decreases, decrease the magnitude of the electromagnetic braking force generated by the electromotive force generation mechanism while maintaining the magnitude of the mechanical braking force generated by the braking force generation mechanism; and in a case where the state is caused to transition from the second state to the first state, when the magnitude of the required braking force increases, decrease the magnitude of the electromagnetic driving force generated by the electromotive force generation mechanism while maintaining the magnitude of the mechanical braking force generated by the braking force generation mechanism, and when the magnitude of the required braking force decreases, decrease the magnitude of the mechanical braking force generated by the braking force generation mechanism while maintaining the magnitude of the electromagnetic braking force generated by the electromotive force generation mechanism.

4. The braking force control apparatus for a vehicle according to claim 2, wherein the braking control means is configured to:

compare an increased or decreased amount in the magnitude of the determined required braking force and a predetermined amount set in advance with each other;

either increase or decrease, when the increased or decreased amount is more than the predetermined amount set in advance, the magnitude of the mechanical braking force generated by the braking force generation mechanism depending on a magnitude of the increased or decreased amount; and either increase or decrease, when the increased or decreased amount is equal to or less than the predetermined amount set in advance, the magnitude of the electromagnetic braking force generated by the electromotive force generation mechanism depending on the magnitude of the increased or decreased amount.

5. The braking force control apparatus for a vehicle according to claim 1, wherein the braking control means uses, when the state is caused to transition, any one of the electromagnetic driving force generated by the electromotive force generation mechanism, the electromagnetic braking force generated by the electromotive force generation mechanism, and the mechanical braking force generated by the braking force generation mechanism to avoid a tendency of lock of the wheel.

6. The braking force control apparatus for a vehicle according to claim 5, wherein the braking control means is configured to, in the case where the state is caused to transition:

use, when a magnitude of a friction coefficient of a road surface on which the vehicle travels is smaller than a magnitude of a predetermined friction coefficient, the electromagnetic driving force or the electromagnetic braking force generated by the electromotive force generation mechanism so as to avoid the tendency of the lock of the wheel; and use, when the magnitude of the friction coefficient of the road surface on which the vehicle travels is equal to or more than the magnitude of the predetermined friction coefficient, the mechanical braking force generated by the braking force generation mechanism so as to avoid the tendency of the lock of the wheel.

7. The braking force control apparatus for a vehicle according to claim 5, wherein the braking control means is configured to:

use, when the state is caused to transition from the first state to the second state, the electromagnetic driving force or the electromagnetic braking force generated by the electromotive force generation mechanism so as to avoid the tendency of the lock of the wheel; and use, when the state is caused to transition from the second state to the first state, the mechanical braking force generated by the braking force generation mechanism so as to avoid the tendency of the lock of the wheel.

8. The braking force control apparatus for a vehicle according to claim 1, wherein the braking control means causes, when the electromotive force generation mechanism transitions from a state where one of the electromagnetic driving force and the electromagnetic braking force is generated to a state where another of the electromagnetic driving force and the electromagnetic braking force is generated, the state to transition from the one of the first state and the second state to the another of the first state and the second state.

9. The braking force control apparatus for a vehicle according to claim 1, wherein the braking control means causes, when a driver carries out an operation of changing a travel state of the vehicle, the state to transition from the one of the first state and the second state to the another of the first state and the second state.

10. The braking force control apparatus for a vehicle according to claim 9, wherein the operation carried out by the driver to change the travel state of the vehicle comprises at least one of a brake operation for braking the vehicle, an accelerator operation for accelerating the vehicle, or a steering operation for turning the vehicle.

11. The braking force control apparatus for a vehicle according to claim 10, wherein the braking control means is configured to:
- control, when the driver carries out the brake operation, the electromotive force generation mechanism to generate the electromagnetic braking force or control the braking force generation mechanism to generate the mechanical braking force earlier in time;
- control, when the driver carries out the accelerator operation, the electromotive force generation mechanism to generate the electromagnetic driving force earlier in time; and
- control, when the driver carries out the steering operation, the electromotive force generation mechanism to generate the electromagnetic braking force or control the braking force generation mechanism to generate the mechanical braking force on a wheel on an inside of turn of the vehicle earlier in time, and control the electromotive force generation mechanism to generate the electromagnetic driving force on a wheel on an outside of the turn of the vehicle earlier in time.

12. The braking force control apparatus for a vehicle according to claim 1, wherein the braking control means causes, based on a state of a road surface on which the vehicle travels, the state to transition from the one of the first state and the second state to the another of the first state and the second state.

13. The braking force control apparatus for a vehicle according to claim 12, wherein the braking control means is configured to:
- estimate a slip ratio generated on the wheel, thereby estimating, based on the estimated slip ratio, a magnitude of a friction coefficient of the road surface on which the vehicle travels;
- determine, when the magnitude of the estimated friction coefficient of the road surface is less than a magnitude of a predetermined friction coefficient, to cause the state to transition from the first state to the second state; and
- determine, when the magnitude of the estimated friction coefficient of the road surface is equal to or more than the magnitude of the predetermined friction coefficient, to cause the state to transition from the second state to the first state.

\* \* \* \* \*